US012461495B2

United States Patent
Miyabe

(10) Patent No.: US 12,461,495 B2
(45) Date of Patent: Nov. 4, 2025

(54) DISTURBANCE ESTIMATING APPARATUS, METHOD, AND COMPUTER PROGRAM

(71) Applicant: Furuno Electric Co., Ltd., Hyogo (JP)

(72) Inventor: Yuta Miyabe, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 403 days.

(21) Appl. No.: 17/746,882

(22) Filed: May 17, 2022

(65) Prior Publication Data

US 2023/0375989 A1 Nov. 23, 2023

(51) Int. Cl.
*G05B 13/04* (2006.01)
*G01S 19/01* (2010.01)
(Continued)

(52) U.S. Cl.
CPC ............ *G05B 13/048* (2013.01); *G01S 19/01* (2013.01); *G05B 11/36* (2013.01); *G05D 1/0875* (2013.01)

(58) Field of Classification Search
CPC ....... G05B 13/048; G05B 11/36; G01S 19/01; G05D 1/0875
(Continued)

(56) References Cited

U.S. PATENT DOCUMENTS 3,603,775 A * 9/1971 Galloway ............ G05D 1/0206
701/499
3,803,916 A * 4/1974 Dematteo ............ G01C 21/188
73/382 R
(Continued)

FOREIGN PATENT DOCUMENTS

JP 2006297977 A * 11/2006 ............ B63H 25/00
JP 5390453 B2 * 1/2014
(Continued)

OTHER PUBLICATIONS

Razgallah, Intissar et al. "The Impact of Free Surface Modelling on Hydrodynamic Forces for Ship Navigating in Inland Waterways: Water Depth, Drift Angle, and Ship Speed Effect." Journal of marine science and technology 24.2 (2019): 620-641. Web. (Year: 2019).*
(Continued)

*Primary Examiner* — Ramya P Burgess
*Assistant Examiner* — Keith A von Volkenburg
(74) *Attorney, Agent, or Firm* — Alleman Hall & Tuttle LLP

(57) ABSTRACT

A disturbance estimation apparatus that includes a position data receiver, a thrust data receiver, and processing circuitry is provided. The position data receiver receives position data indicating a position of a ship. The thrust data receiver receives thrust data indicating a thrust force driving the ship during navigation. The processing circuitry determines a magnitude of the thrust force based on the thrust data, and determines, based on the position data, disturbance data including a drift direction in which the ship drifts due to an external force and a drift speed of the ship while the thrust force is less than a threshold value. The processing circuitry outputs the disturbance data that indicates disturbance acting on the ship and assists to control movement of the ship for automatically maintaining a selected position or heading direction of the ship.

19 Claims, 17 Drawing Sheets

(51) Int. Cl.
  *G05B 11/36* (2006.01)
  *G05D 1/00* (2024.01)
(58) Field of Classification Search
  USPC .......................................................... 701/21
  See application file for complete search history.

(56) References Cited

U.S. PATENT DOCUMENTS

| | | | | | |
|---|---|---|---|---|---|
| 3,922,632 | A | * | 11/1975 | Murphree | G01S 1/02 367/133 |
| 4,161,730 | A | * | 7/1979 | Anderson | G01S 13/46 342/52 |
| 4,652,728 | A | * | 3/1987 | Galiana | B63B 49/00 235/84 |
| 5,983,145 | A | * | 11/1999 | Becker | B63H 25/04 701/26 |
| 10,048,690 | B1 | * | 8/2018 | Hilbert | B63H 25/42 |
| 11,059,558 | B2 | | 7/2021 | Wong et al. | |
| 2010/0042349 | A1 | * | 2/2010 | Eriksson | G01C 19/00 702/94 |
| 2011/0126647 | A1 | * | 6/2011 | Newland | G01C 21/06 74/5.6 R |
| 2012/0130570 | A1 | * | 5/2012 | Pease | B63H 25/04 701/21 |
| 2013/0173096 | A1 | * | 7/2013 | Chalhoub | B63J 99/00 701/21 |
| 2014/0116311 | A1 | * | 5/2014 | Holemans | B63C 7/003 114/102.16 |
| 2015/0241557 | A1 | * | 8/2015 | Takemoto | G01S 13/62 342/104 |
| 2019/0084662 | A1 | * | 3/2019 | Wong | B63H 25/04 |
| 2019/0092443 | A1 | * | 3/2019 | Murru | B63H 25/04 |
| 2019/0339700 | A1 | * | 11/2019 | Berg | B63H 9/061 |
| 2020/0017177 | A1 | * | 1/2020 | Eyal | G05D 1/43 |
| 2020/0150677 | A1 | * | 5/2020 | Walters | G05D 1/0206 |
| 2020/0326711 | A1 | * | 10/2020 | Rimmer | G01C 21/203 |
| 2020/0393574 | A1 | * | 12/2020 | Nakamura | G01C 21/203 |
| 2020/0407030 | A1 | * | 12/2020 | Ueno | B63H 79/10 |
| 2020/0407034 | A1 | * | 12/2020 | Ueno | B63H 21/213 |
| 2021/0001964 | A1 | * | 1/2021 | Ueno | B63H 25/04 |
| 2021/0078687 | A1 | * | 3/2021 | Ueno | G05D 13/64 |
| 2021/0114458 | A1 | * | 4/2021 | Osaki | B63H 21/22 |
| 2021/0124059 | A1 | * | 4/2021 | Kowada | G01S 19/22 |
| 2022/0017203 | A1 | * | 1/2022 | Pedersen | B63H 25/42 |

FOREIGN PATENT DOCUMENTS

| | | |
|---|---|---|
| JP | 2021041872 A | 3/2021 |
| WO | 2015129337 A1 | 9/2015 |
| WO | 2016017358 A1 | 2/2016 |

OTHER PUBLICATIONS

Hu, Xiong, Boyi Zhang, and Gang Tang. "Research on Ship Motion Prediction Algorithm Based on Dual-Pass Long Short-Term Memory Neural Network." IEEE access 9 (2021): 28429-28438. Web. (Year: 2021).*

Kaplan, E. D., & Hegarty, C. (Eds.). (2017). Understanding GPS/GNSS: principles and applications. Artech house. (Year: 2017).*

Xue, Han, Rodolfo E Haber, and Rodolfo E Haber. "Adaptive Neural Backstepping Sliding Mode Heading Control for Underactuated Ships with Drift Angle and Ship-Bank Interaction." Computational intelligence and neuroscience 2020.2020 (2020): 1-18. Web. (Year: 2020).*

* cited by examiner

DISTURBANCE ESTIMATING APPARATUS, METHOD, AND COMPUTER PROGRAM

BACKGROUND

Technical Field

The present disclosure mainly relates to a method and an apparatus for estimating disturbance and positioning a marine vessel, and more specifically, to a method and an apparatus for automatically maintaining a selected position or heading direction of a marine vessel.

Description of the Related Art

In an automatic maneuvering (auto-pilot) of a ship or a fixed position holding of a ship, the required information, such as position information and speed information, is acquired by determining a position of the ship using a GNSS (Global Navigation Satellite System) device on the ship. Based on the position information and the speed information, the hull of the ship is controlled toward the desired course and the fixed position. However, disturbance usually acts on the ship, which can interfere with stable control. Here, "disturbance" is defined as interference (force) that various equipment receives from outside with respect to its normal operating state. Ships are no exception, and wave forces or air forces caused by ocean waves or wind, and irregularities in the sea surface may be the main reason of the disturbances.

Normally, an amount of ship movement acquired during maneuvering includes "an amount of ship movement due to thrust generated by the ship", and "an amount of ship movement due to disturbance". It is difficult to accurately estimate the disturbance from the position information of the ship, because it is difficult to distinguish them based on the position information of the ship. Moreover, this disturbance usually changes by increments. If it is possible to ascertain in a timely manner how much disturbance affects the control of the ship, the hull control can be performed more appropriately. As a result, it is expected that the destination can be reached faster and more accurately.

For the aforementioned reasons, there is a need for providing a method and an apparatus for estimating disturbance acting on the ship in a timely and accurate manner to navigate the ship to the destination faster or holding the ship at a fixed position.

SUMMARY

In an embodiment of the present disclosure, there is provided a disturbance estimation apparatus that includes a position data receiver, a thrust data receiver, and processing circuitry. The position data receiver configured to receive position data indicating a position of a ship. The thrust data receiver configured to receive thrust data indicating a thrust force driving the ship during navigation. The processing circuitry configured to determine a magnitude of the thrust force based on the thrust data, and determine, based on the position data, disturbance data including a drift direction in which the ship drifts due to an external force while the thrust force is less than a threshold value. The processing circuitry further configured to output the disturbance data. The disturbance data indicates disturbance acting on the ship and assists to control movement of the ship.

Additionally, or optionally, the processing circuitry is further configured to determine the drift direction of the disturbance acting on the ship, after a predetermined period of time has elapsed since the thrust force has fallen below the threshold value, and while the thrust force is less than the threshold value.

In another aspect of the present disclosure, there is provided disturbance estimation method. The disturbance estimation method includes receiving position data indicating a position of a ship, and receiving thrust data indicating a thrust force driving the ship during navigation. The disturbance estimation method further includes determining a magnitude of the thrust force based on the thrust data, and determining, based on the position data, disturbance data including a drift direction in which the ship drifts due to an external force while the thrust force is less than a threshold value. The disturbance estimation method further includes outputting the disturbance data. The disturbance data indicates disturbance acting on the ship and assists to control movement of the ship.

In yet another aspect of the present disclosure, there is provided a non-transitory computer readable medium having stored thereon computer-executable instructions which, when executed by a computer, cause the computer to receive position data indicating a position of a ship, receive thrust data indicating a thrust force driving the ship during navigation, determine a magnitude of the thrust force based on the thrust data, determine, based on the position data, disturbance data including a drift direction in which the ship drifts due to an external force while the thrust force is less than a threshold value, and output the disturbance data. The disturbance data indicates disturbance acting on the ship and assists to control movement of the ship.

The disturbance estimation apparatus of the present disclosure enables the ship to accurately grasp the disturbances, as a result the ship will be able to be controlled ahead of time when the ship changes direction. As well as improving the performance of holding a ship at a fixed position is enabled by accurately grasping disturbances, leading to improvement of straight running and turning performance. For example, when turning, the trim rudder angle for resisting the disturbances is reset. As the disturbance is grasped ahead of turning, the required trim rudder angle can relatively easily be predicted. The disturbance data is displayed on a display to indicate the disturbances accurately. In addition to the advantages of manual operation, especially for those who are fishing, how fast the current ship is drifting in which direction is valuable for obtaining a movement of fish. The disturbance data is one of important information that assists the user in navigation of ship or holding the ship at fixed position or while fishing.

BRIEF DESCRIPTION OF DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DETAILED DESCRIPTION OF THE EMBODIMENTS

Figure 1:
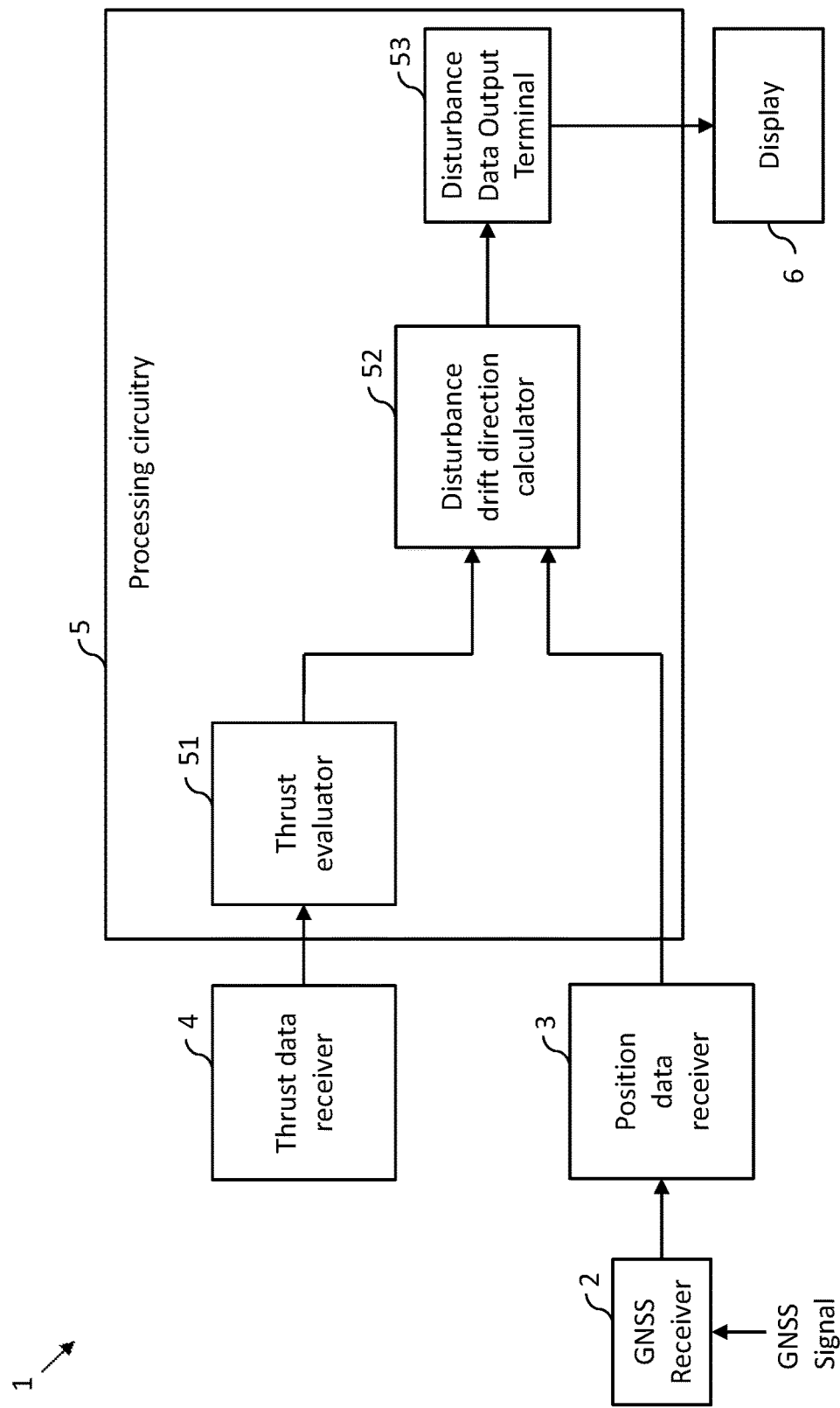
FIG. 1 is a block diagram illustrating a configuration of a disturbance estimation apparatus for automatically maintaining a selected position or heading direction of a ship, according to an embodiment of the present disclosure.

Example apparatus are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

FIG. 1 is a block diagram illustrating a configuration of a disturbance estimation apparatus 1 for automatically maintaining a selected position or heading direction of a ship 200, according to an embodiment of the present disclosure.

The disturbance estimation apparatus 1 may be installed on the ship 200 for estimating disturbance acting on the ship 200 while navigation of the ship 200 from a source location to a destination location and while maintaining a fixed position of the ship 200. The disturbance acting on the ship 200 must be continuously monitored. The disturbance estimation apparatus 1 is configured to be used for automatically maintaining the selected position or heading direction of the ship 200 by estimating the disturbance acting on the ship 200 due to tidal currents, wind currents, and the like. Automatic maneuvering (auto-pilot) of the ship 200, controls movement of the ship 200, such as navigation or maintaining the fixed position the ship 200, with assistance of the disturbance estimation apparatus 1.

The disturbance estimation apparatus 1 includes a global navigation satellite system (GNSS) receiver 2, a position data receiver 3, a thrust data receiver 4, processing circuitry 5, and a display 6.

The GNSS receiver 2 obtains a plurality of signals form a global navigation network system and determines a position of the ship 200 based on the plurality of signals (hereinafter also referred to as "GNSS signal") to generate the position data. The GNSS receiver 2 provides the position data of the ship 200 to the position data receiver 3. The determination of the position of the ship 200 based on the GNSS signal may performed periodically or continuously, and a moving direction and a moving speed of the ship 200 may be determined along with the position data of the ship 200. In one embodiment, the moving direct and the moving speed may be determined by a device other than the GNSS receiver 2, such as a ship speedometer.

The position data receiver 3 receives the position data indicating the position of the ship 200. In one embodiment, the position data receiver 3 receives the position data from the GNSS receiver 2. The thrust data receiver 4 receives thrust data indicating a thrust force driving the ship 200 during navigation. The processing circuitry 5 determines a magnitude of the thrust force, based on the thrust data, and determines, based on the position data, disturbance data including a drift direction in which the ship drifts by an external force, while the thrust force is less than a threshold value. The disturbance data indicates disturbance acting on the ship 200 and assists to control movement of the ship 200 for accurate navigation or holding the ship 200 at a fixed position. The processing circuitry 5 outputs the disturbance data.

Figure 2:
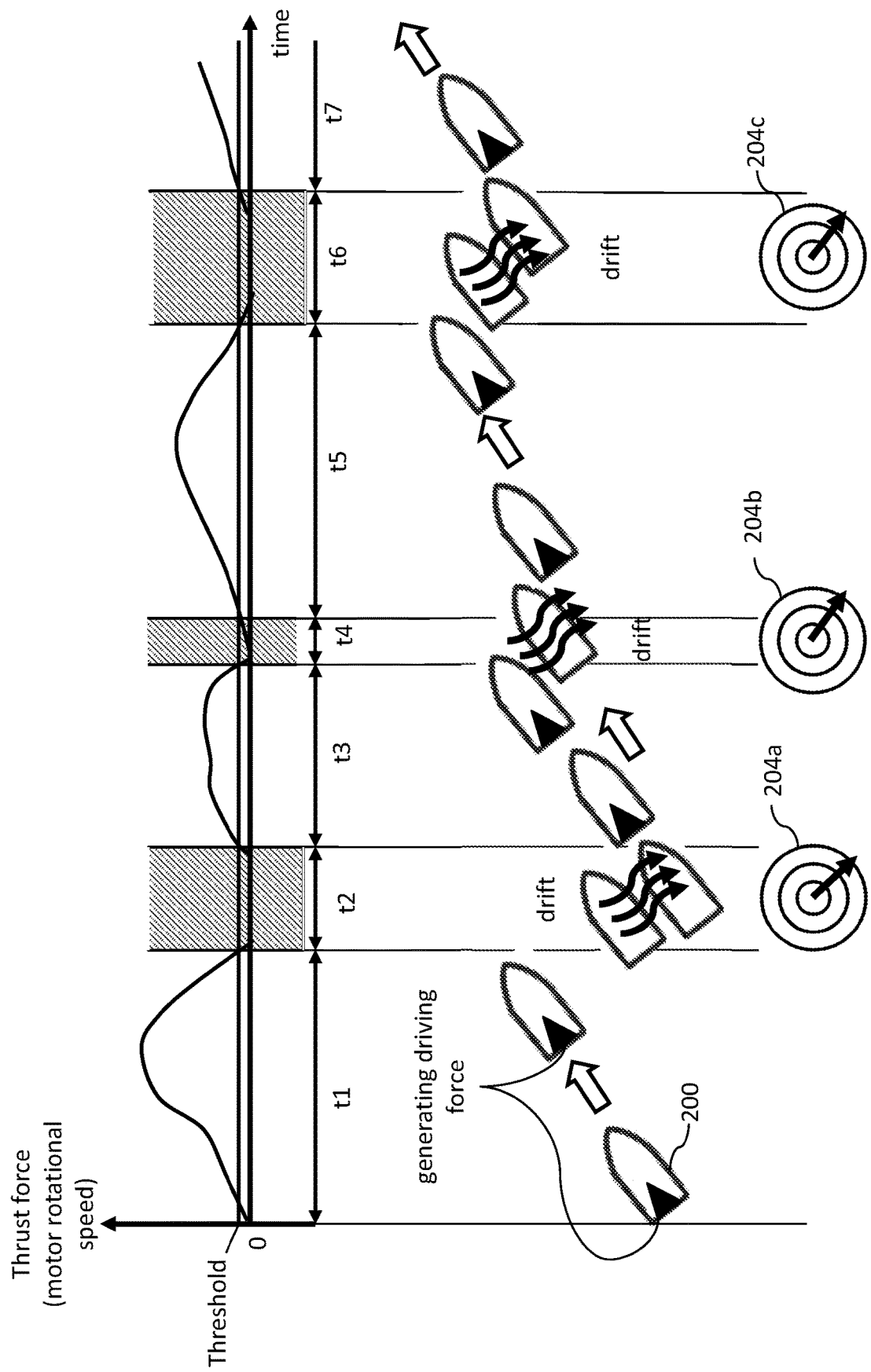
FIG. 2 illustrates an exemplary scenario for determination of the disturbance data according to an embodiment of the present disclosure.

With continued reference to FIG. 1, the processing circuitry 5 includes a thrust evaluator 51, a disturbance drift direction calculator 52, and a disturbance data output terminal 53. Referring now to FIGS. 1 and 2, an operative state of the ship 200 is evaluated, based on the thrust data acquired by a sensor (shown later) mounted on the motor (engine) or a hull of the ship 200. When an operation of generating thrust force is stopped, preferably when it is determined that the ship 200 should be in a stopped state, the estimation processing of the disturbance data on the hull is started. The disturbance data determination is carried out by grasping the position of the hull at every prescribed time or continuously by the GNSS receiver on the ship (hull) 200 and thus the disturbance drift direction calculator 52 determines the drift direction of the ship 200.

It will be understood by a person skilled in the art that although "motor" is referred to in the current embodiment of the present disclosure, alternatively "engine of an internal combustion" may be used in addition to an electric motor, without deviating from the scope of the present disclosure.

On the other hand, the thrust evaluator 51 periodically or constantly monitors the operative state of the ship, and when it is determined that the ship starts moving again, the disturbance data determination is interrupted. By using the stopped state as a trigger to start the disturbance estimation process, it is possible to obtain the disturbance data that eliminates the influence of the thrust force of the ship. Basically, the disturbance estimation apparatus 1 is intended for anglers or users who needs to make the ship 200 hold at a fixed-point. In such a situation, the engine is repeatedly stopped and started. The disturbance data output terminal 53 outputs the disturbance data including the drift direction of the ship 200.

FIG. 2 illustrates an exemplary scenario for determination of the disturbance data according to an embodiment of the present disclosure. A graph showing how the thrust force changes with the passage of time and a movement of the ship 200 in relation to the change is shown in FIG. 2. In the graph, the horizontal axis shows "time" and the vertical axis shows "thrust force" of the ship. Here, the rotational speed of the motor (engine) is employed indicating the magnitude of the thrust force. The graph further includes an indication for the threshold value for the thrust force denoted as "Threshold" in the graph. FIG. 2 further includes indicators 204a-204c indicating the determined drift directions of disturbances when the disturbance estimation processing is performed.

As shown in FIG. 2, the thrust force increases and decreases as time passes from the start. The thrust force is greater than the threshold during the time periods t1, t3, t5, and t7, during which the driving force or the thrust force is generated due to the high rotational speed of the motor. The thrust force is less than the threshold value three times, i.e., during the time periods t2, t4, and t6. In one embodiment, the threshold value may be zero. In another embodiment, the threshold value may not be zero. Therefore, even if the rotational speed of the motor is not completely zero, the thrust force is gone. Thus, for the sake of ongoing discussions it is assumed that the threshold value is slightly higher than zero.

When the rotational speed drops below zero, the ship 200 loses its thrust force and drifts away. Thus, when the thrust force is less than the threshold value, i.e., during the time periods t2, t4, and t6, the disturbance estimation apparatus 1 determines the disturbance data including the drift directions for corresponding time period in which the ship 200 is swept or drifted by the disturbance.

The actual position of the ship 200 is obtained periodically or continuously from the position data receiver 2. The drift directions are determined based on the change of the position during corresponding time period. The drift direction calculated for each drift is indicated by the indicators 204a-204c each having an arrow indicating the drift direction above the concentric circle and displayed on the display 6 as shown in FIG. 2.

Referring now to FIGS. 1 and 2, the disturbance data output terminal 53 may be operably coupled with, and hence in communication with the disturbance drift direction calculator 52 and the display 6. The disturbance data output terminal 53 outputs the disturbance data for displaying the disturbance data on the display 6 that assists in controlling the navigation and/or movement of the ship 200.

Figure 3:
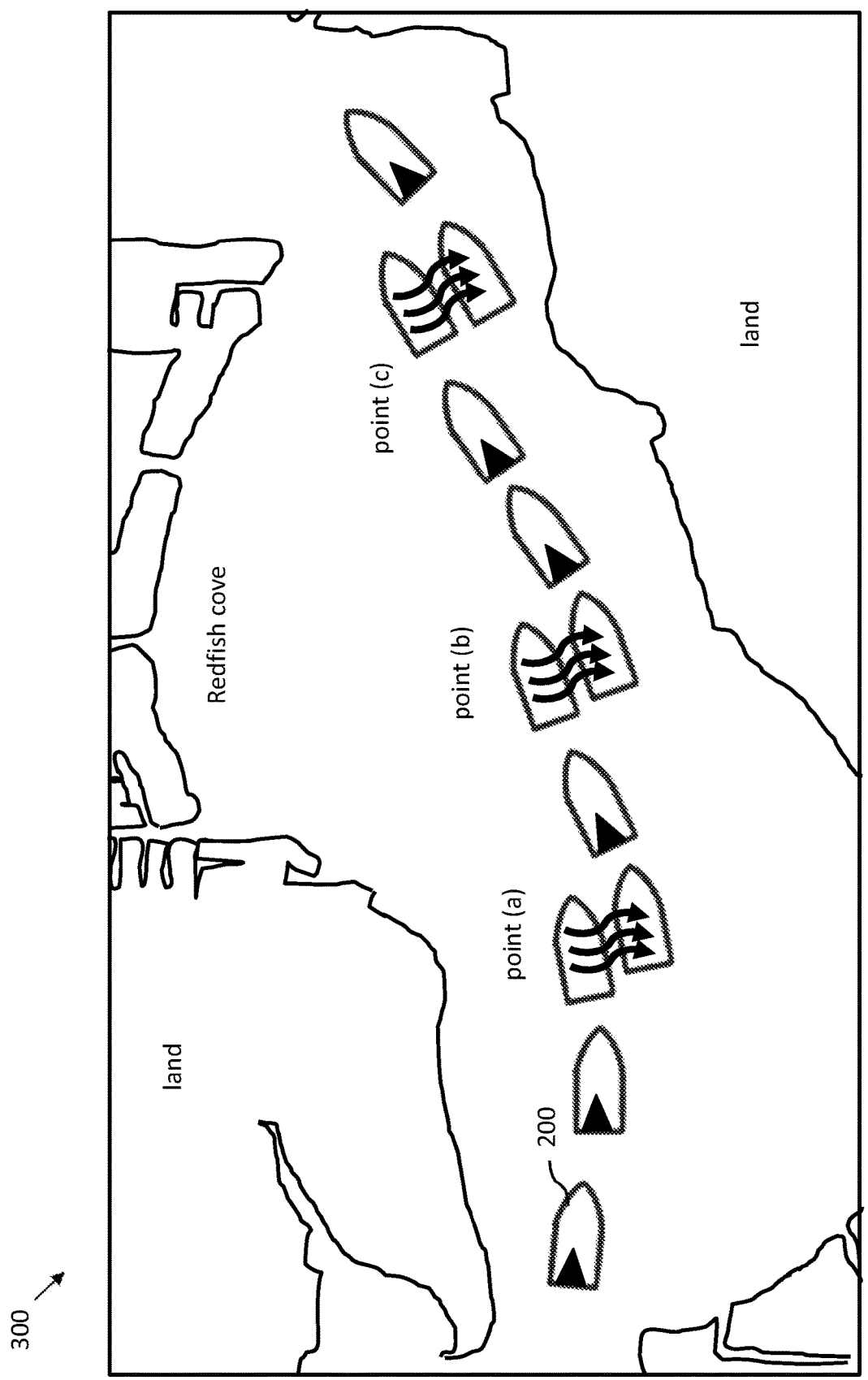
FIG. 3 illustrates a chart including a region surrounding the ship and the disturbance data according to an embodiment of the present disclosure.

FIG. 3 illustrates a chart 300 including a region surrounding the ship 200 and the disturbance data according to an embodiment of the present disclosure. The display 6 may be located on-board the ship 200 and provided with, or in electrical connection to, the processing circuitry 5 on the ship 200, as the ship instrument for purposes as will be explained in detail later herein. The display 6 displays the chart 300 including a region (for example, Redfish cove) where the ship 200 navigates. In addition, the display 6 displays the disturbance data including the drift direction at a display position on the chart 300. The display position corresponds to a location at which the disturbance data is determined. The disturbance data is stored in a database (not shown) of the disturbance estimating apparatus 1 as time series data as "drift direction" (direction information of ship movement). The information is stored in association with the time and position information of each disturbance estimation process. The display 6 may be a multifunctional display that may be used to store to the database the above information.

FIG. 3 shows the ship 200 cruising west to east (from left to right) in Redfish Cove, Florida. The motor of the ship 200 is stopped three times on the way (point (a)-(c)), and during this time, the ship 200 had no thrust and drifted due to disturbance. The drift direction is generally shifted from the upper left to the lower right in the figure. The drift direction is determined by the disturbance estimation apparatus 1 (i.e., the disturbance drift direction calculator 52) of the present disclosure, and is displayed on the display 6 in association with the point where the ship 200 is drifting.

The display 6 may be configured as, for example, a display screen that forms part of a navigation assisting device to which a ship operator, i.e., a user, who operates the ship 200 refers. However, the display 6 is not limited to the above configuration, and, for example, it may be a display screen for a portable computer which is carried by a ship operator's assistant who monitors the surrounding situation from the ship 200, a display screen for a passenger to watch in the cabin of the ship 200, or a display part for a head mounted display, such as a wearable glass, worn by a passenger.

Figure 4:
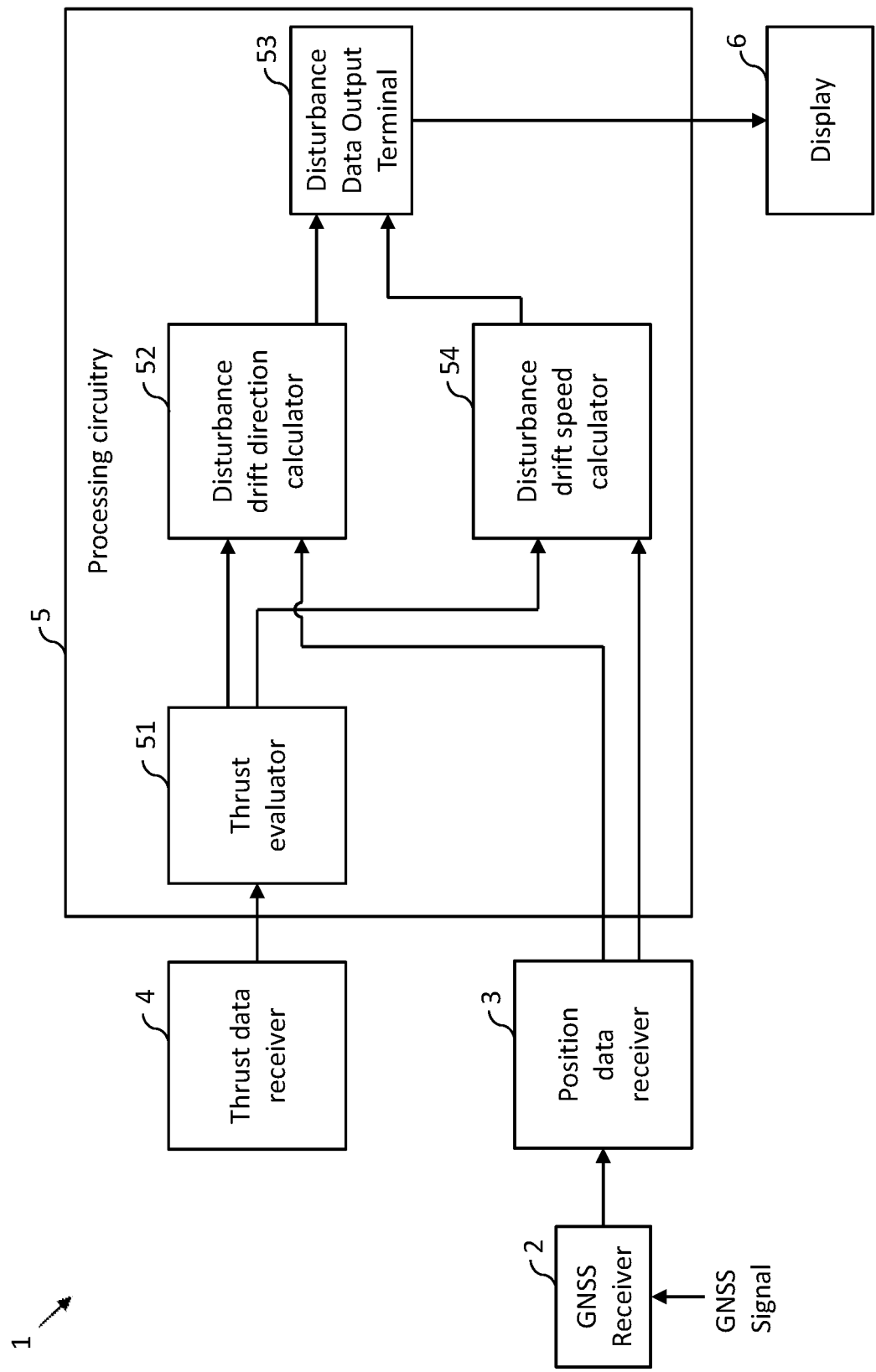
FIG. 4 is a block diagram illustrating a configuration of the disturbance estimation apparatus for automatically maintaining a selected position or heading direction of the ship, according to another embodiment of the present disclosure.

FIG. 4 is a block diagram illustrating a configuration of the disturbance estimation apparatus 1 for automatically maintaining a selected position or heading direction of the ship 200, according to another embodiment of the present disclosure.

The processing circuitry 5 of the disturbance estimation apparatus 1 further includes a disturbance drift speed calculator 54 that receives the thrust force from the thrust evaluator 51 and the position data from the position data receiver 3. The disturbance drift speed calculator 54 determines, based on the position data, a drift speed of the ship 200 that is drifted by the external force while the thrust force is less than the threshold value. The disturbance data further includes the drift speed of the ship 200. The drift speed varies depending on a size and a shape of the ship 200, even if the disturbance factors such as tidal currents and wind currents are the same. Here, the speed of the ship 200 which is acted by the disturbance is defined as the speed with which the ship 200 is moved by the disturbance, that is "drift speed of disturbance."

When an operation of generating thrust force is stopped, preferably when it is determined that the ship 200 should be in a stopped state, the estimation processing of the disturbance data on the hull is started. The disturbance data determination is carried out by grasping the position of the hull at every prescribed time or continuously by the GNSS receiver on the ship (hull) 200, and thus the disturbance drift direction calculator 52 determines the drift direction of the ship 200 and the disturbance drift speed calculator 54 determines the drift speed of the ship 200.

On the other hand, the thrust evaluator 51 periodically or constantly monitors the operative state of the ship, and when it is determined that the ship starts moving again, the disturbance data determination is interrupted. By using the stopped state as a trigger to start the disturbance estimation process, it is possible to obtain the disturbance data that eliminates the influence of the thrust force of the ship. Basically, the disturbance estimation apparatus 1 is intended for anglers or users who needs to make the ship 200 hold at a fixed-point. In such a situation, the engine is repeatedly stopped and started. The disturbance data output terminal 53 outputs the disturbance data including the drift direction and the drift speed of the ship 200.

Figure 5:
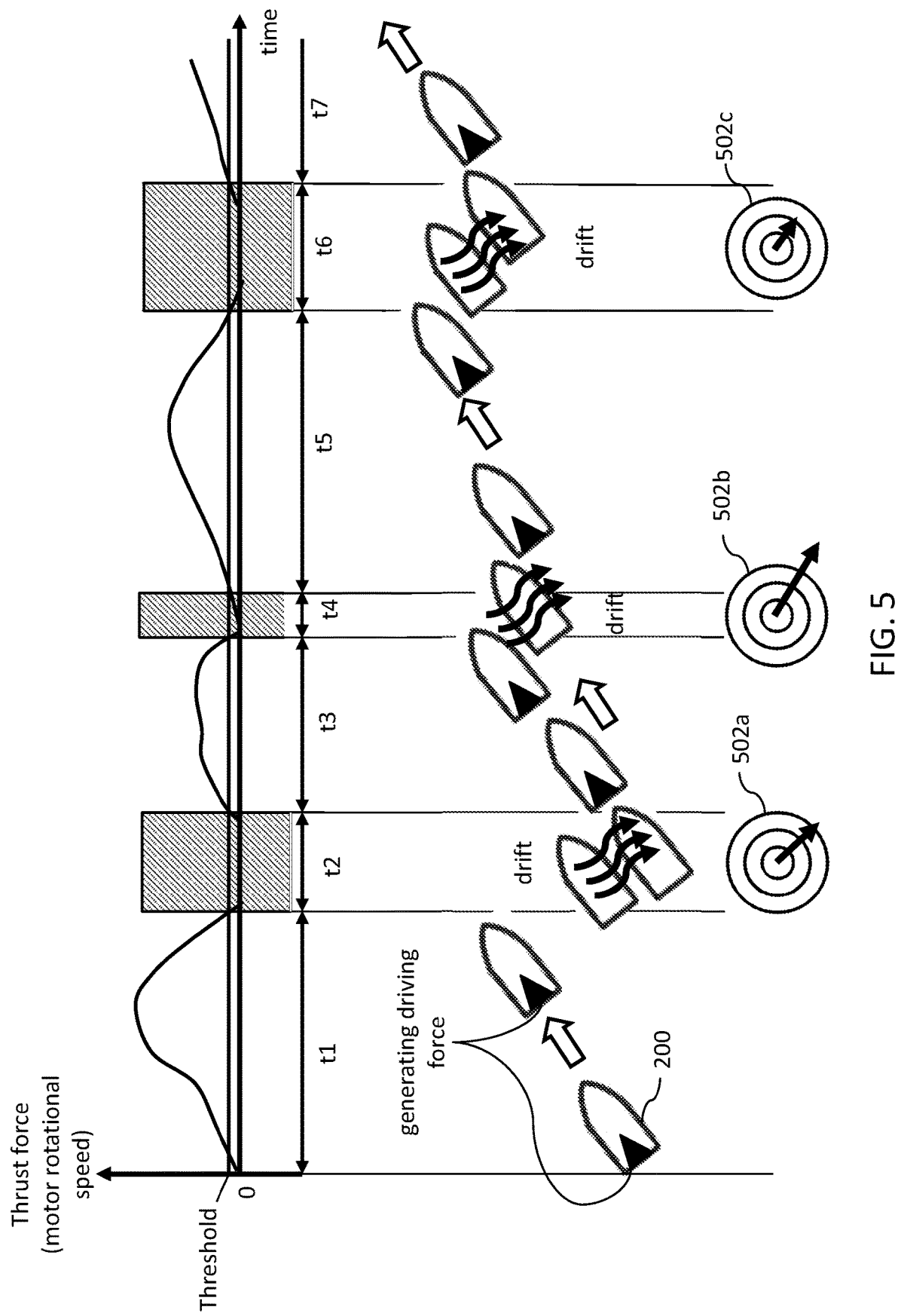
FIG. 5 illustrates an exemplary scenario for determination of the disturbance data according to another embodiment of the present disclosure.

FIG. 5 illustrates an exemplary scenario for determination of the disturbance data according to another embodiment of the present disclosure. A graph showing how the thrust force changes with the passage of time and a movement of the ship 200 in relation to the change is shown in FIG. 5. In the graph, the horizontal axis shows "time" and the vertical axis shows "thrust force" of the ship. Here, the rotational speed of the motor (engine) is employed indicating the magnitude of the thrust force. The graph further includes an indication for the threshold value for the thrust force denoted as "Threshold" in the graph. FIG. 5 further includes indicators 502a-502c indicating the determined drift directions and the determined drift speeds of disturbances when the disturbance estimation processing is performed.

As shown in FIG. 5, the thrust force increases and decreases as time passes from the start. The thrust force is greater than the threshold during the time periods t1, t3, t5, and t7, during which the driving force or the thrust force is generated due to the high rotational speed of the motor. The thrust force is less than the threshold value three times, i.e., during the time periods t2, t4, and t6. In one embodiment, the threshold value may be zero. In another embodiment, the threshold value may not be zero. Therefore, even if the rotational speed of the motor is not completely zero, the thrust force is gone. Thus, for the sake of ongoing discussions it is assumed that the threshold value is slightly higher than zero.

When the rotational speed drops below zero, the ship 200 loses its thrust force and drifts away. Thus, when the thrust force is less than the threshold value, i.e., during the time periods t2, t4, and t6, the disturbance estimation apparatus 1 determines the disturbance data including the drift directions and the drift speeds for corresponding time period in which the ship 200 is swept or drifted by the disturbance.

The actual position of the ship 200 is obtained periodically or continuously from the position data receiver 2. The drift directions and the drift speeds are determined based on the change of the position during corresponding time period. The drift direction and the drift speed calculated for each drift is indicated by the indicators 502a-502c each having an arrow indicating the drift direction above the concentric circle, the length of the arrow indicates the drift speed and displayed on the display 6 as shown in FIG. 5. In one embodiment, the higher the drift speed, the longer is the length of the arrow of indicators 502a-502.

Referring now to FIGS. 4 and 5, the disturbance data output terminal 53 may be operably coupled with, and hence in communication with the disturbance drift direction calculator 52, the disturbance drift speed calculator 54, and the display 6. The disturbance data output terminal 53 outputs the disturbance data to be displayed on the display 6 that assists in controlling the navigation and/or movement of the ship 200.

Figure 6:
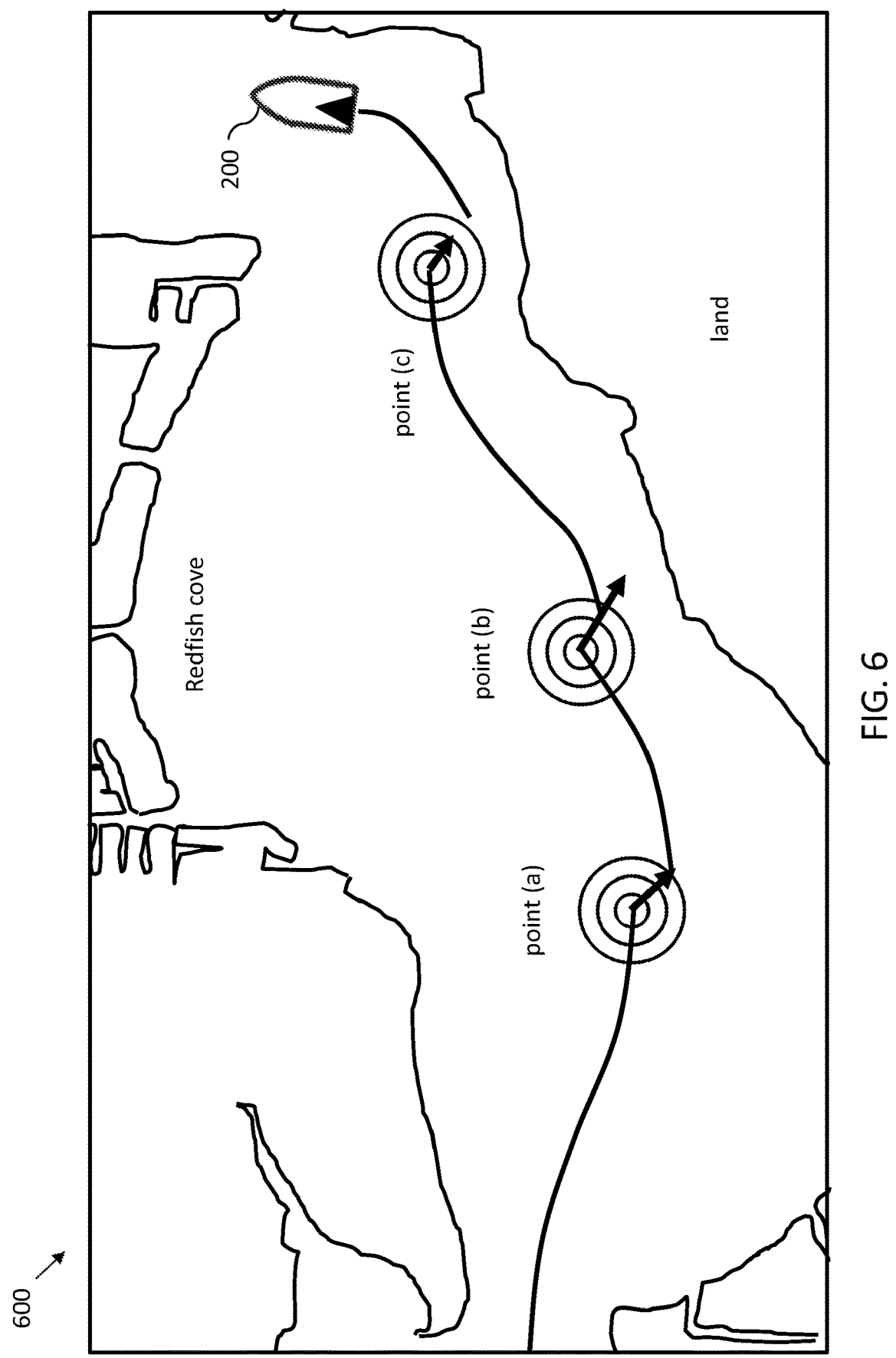
FIG. 6 illustrates a chart including a region surrounding the ship and the disturbance data according to an embodiment of the present disclosure.

FIG. 6 illustrates a chart 600 including a region surrounding the ship 200 and the disturbance data according to an embodiment of the present disclosure. The display 6 may be located on-board the ship 200 and provided with, or in electrical connection to, the processing circuitry 5 on the ship 200, as the ship instrument for purposes as will be explained in detail later herein. The display 6 displays the chart 600 including a region (for example, Redfish cove) where the ship 200 navigates. In addition, the display 6 displays the disturbance data including the drift direction and the drift speed at a display position on the chart 600. The display position corresponds to a location at which the disturbance data is determined. The disturbance data is stored in a database (not shown) of the disturbance estimating apparatus 1 as time series data as "drift direction" (direction information of ship movement) and "drift speed" (speed information of ship movement). The information is stored in association with the time and position information of each disturbance estimation process. The display 6 may be a multifunctional display that may be used to store to the database the above information.

FIG. 6 shows the ship 200 cruising west to east (from left to right) in Redfish Cove, Florida. The motor of the ship 200 is stopped three times on the way (point (a)-(c)), and during this time, the ship 200 had no thrust and drifted due to disturbance. The drift direction is generally shifted from the upper left to the lower right in the figure. The drift direction is determined by the disturbance estimation apparatus 1 (i.e., the disturbance drift direction calculator 52) of the present disclosure, and is displayed on the display 6 in association with the point where the ship 200 is drifting. The drift direction is indicated by arrows on the screen. In this embodiment, the drift speed is also calculated, and its magnitude is known by the length of the arrow.

It will be apparent to a person skilled in the art that although in the current embodiment, the drift direction and drift speed are displayed using arrows, the scope of the present disclosure is not limited to it. In various other embodiments, the drift direction and drift speed may be displayed in any suitable manner, for example, the inside of the circle may be displayed in a gray scale together with the drift direction and drift speed, or the state of the wave may be displayed in a moving image, without deviating from the scope of the present disclosure.

Figure 7:
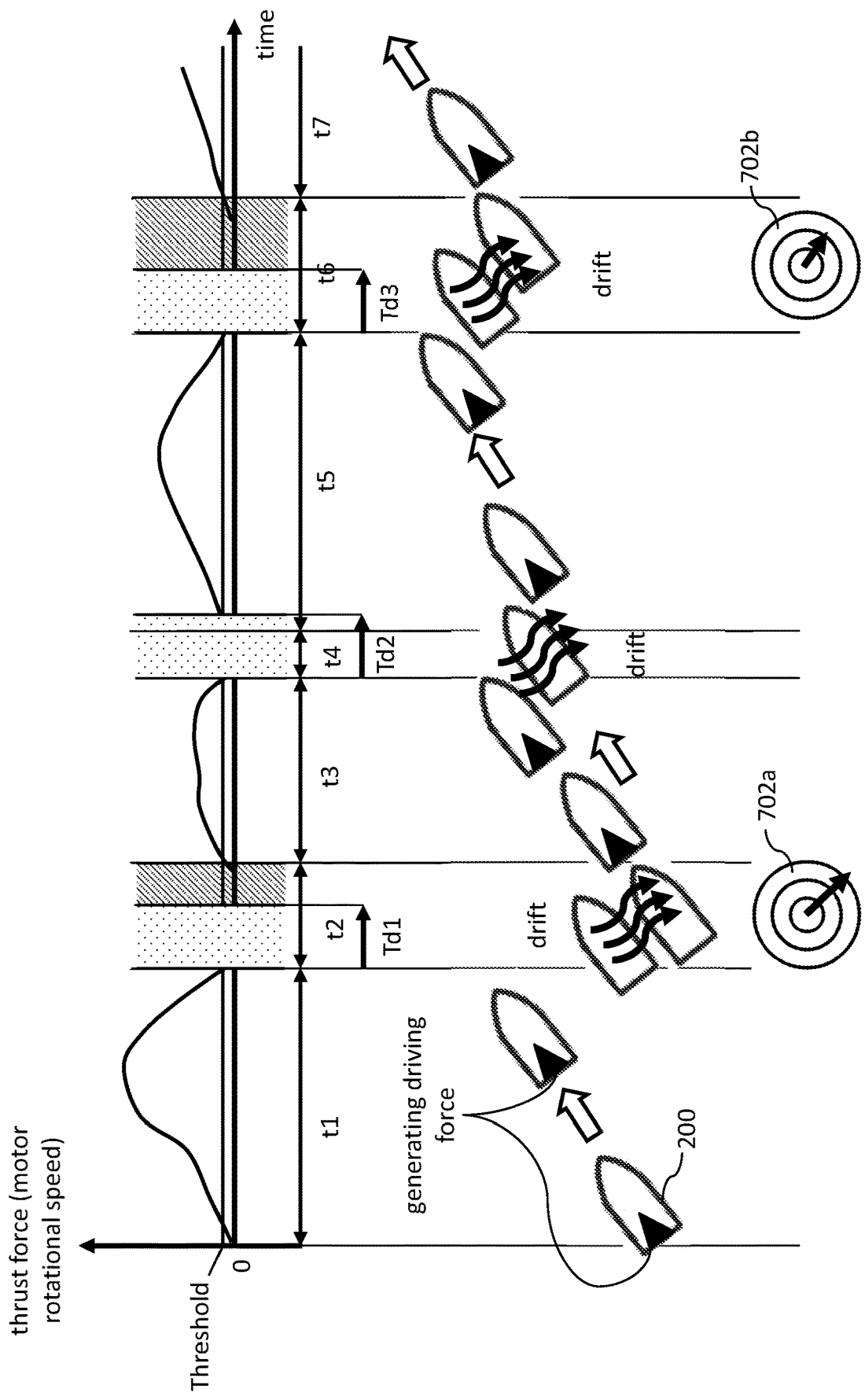
FIG. 7 illustrates an exemplary scenario for determination of the disturbance data according to yet another embodiment of the present disclosure.
Figure 8:
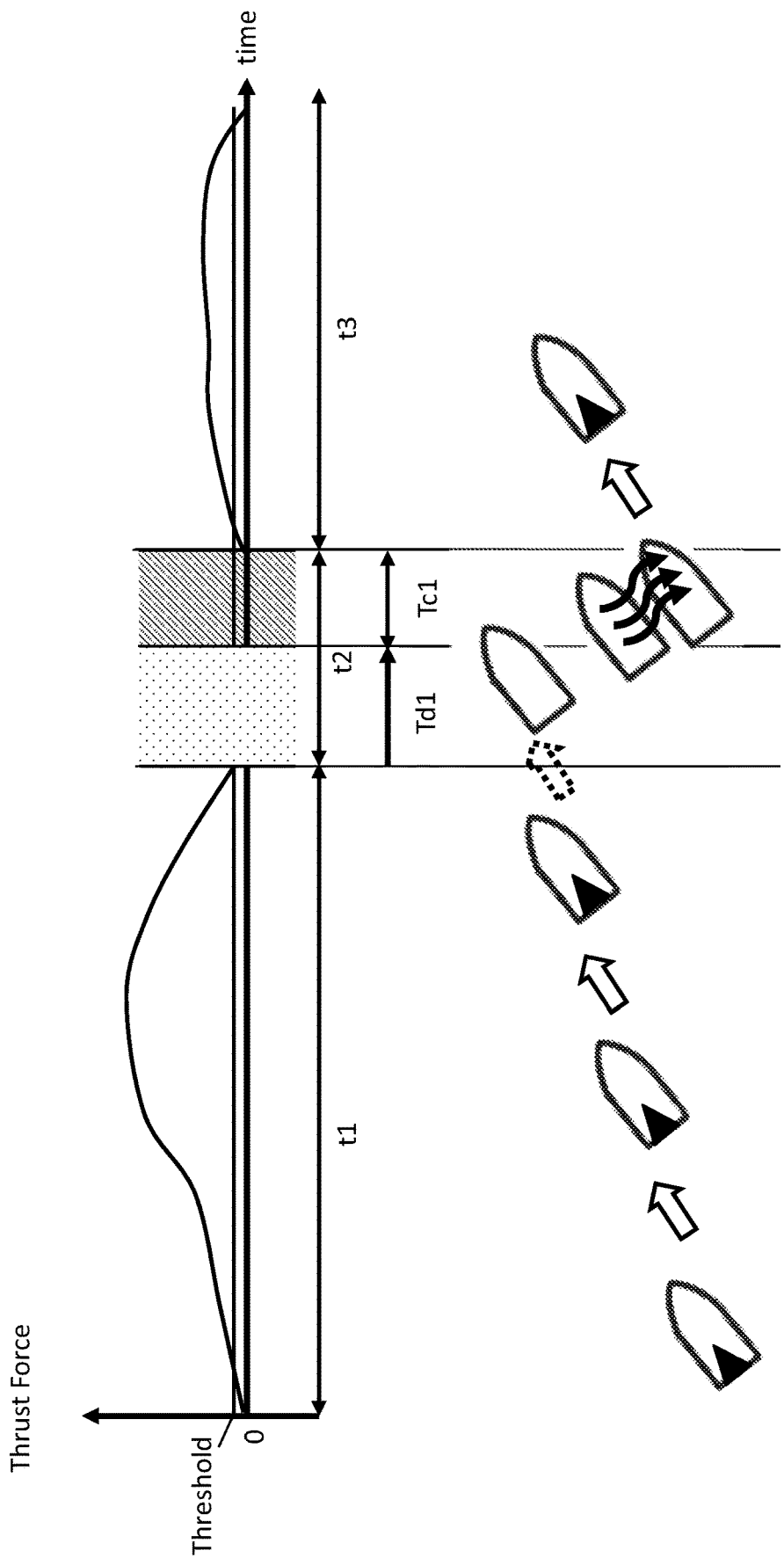
FIG. 8 illustrates determination of the disturbance data for first instance of determination according to yet another embodiment of the present disclosure.

FIG. 7 illustrates an exemplary scenario for determination of the disturbance data according to yet another embodiment of the present disclosure. FIG. 8 illustrates determination of the disturbance data for first instance of determination according to yet another embodiment of the present disclosure. In this embodiment, the processing circuitry 5 determines the drift direction and the drift speed of the disturbance acting on the ship 200, after a predetermined period of time has elapsed since the thrust force has fallen below the threshold value, and while the thrust force is less than the threshold value. The predetermined period of time elapsed since the thrust force has fallen below the threshold value is hereinafter referred to as a dead period. The disturbance estimation processing is not immediately performed even if the thrust force falls below the threshold value. The disturbance estimation processing is started after a predetermined waiting time, i.e., the dead period, has elapsed. The processing is started after the predetermined period of time has elapsed as even if the rotational speed of the motor falls below the threshold value, the propulsion force remains in the ship 200 for a while due to the inertial force of the ship 200.

A graph showing how the thrust force changes with the passage of time and a movement of the ship 200 in relation to the change is shown in FIGS. 7 and 8. In the graph, the horizontal axis shows "time" and the vertical axis shows "thrust force" of the ship 200. Here, the rotational speed of the motor (engine) is employed indicating the magnitude of the thrust force. The graph further includes an indication for the threshold value for the thrust force denoted as "Threshold" in the graph. FIG. 7 further includes indicators 702a and 702b indicating the determined drift directions and the determined drift speeds of disturbances when the disturbance estimation processing is performed.

As shown in FIG. 7, the thrust force increases and decreases as time passes from the start. The thrust force is greater than the threshold during the time periods t1, t3, t5, and t7, during which the driving force or the thrust force is generated due to the high rotational speed of the motor. The thrust force is less than the threshold value three times, i.e., during the time periods t2, t4, and t6. In one embodiment, the threshold value may be zero. In another embodiment, the threshold value may not be zero. Therefore, even if the rotational speed of the motor is not completely zero, the thrust force is gone. Thus, for the sake of ongoing discussions it is assumed that the threshold value is slightly higher than zero.

Further, during the time periods t2 and t6, the thrust force is less than the threshold value even after the dead periods td1 and td3 have elapsed, respectively, thus the disturbance estimation apparatus 1 determines the disturbance data including the drift directions and the drift speeds for corresponding time period in which the ship 200 is swept or drifted by the disturbance. However, during the time period t4, the thrust force is less than the threshold value and the thrust force rises before the dead period td2 has elapsed, thus the disturbance estimation apparatus 1 may not determine the disturbance data for the time period td2 in which the ship 200 is swept or drifted by the disturbance.

Referring now to FIG. 8, during the time period t2, the thrust force is less than the threshold value. During the dead period td1 the thrust force is less than the threshold value but the disturbance is not determined as the ship 200 may have some thrust force due to inertia even if the motor has stopped. After the dead period td1 has elapsed the thrust force is still less than the threshold value, thus the ship 200 may now be affected by disturbance as the thrust force due to inertia would have been near to zero. Therefore, during the time period tc1, the disturbance estimation apparatus 1 determines the disturbance data including the drift directions and the drift speeds.

Figure 9:
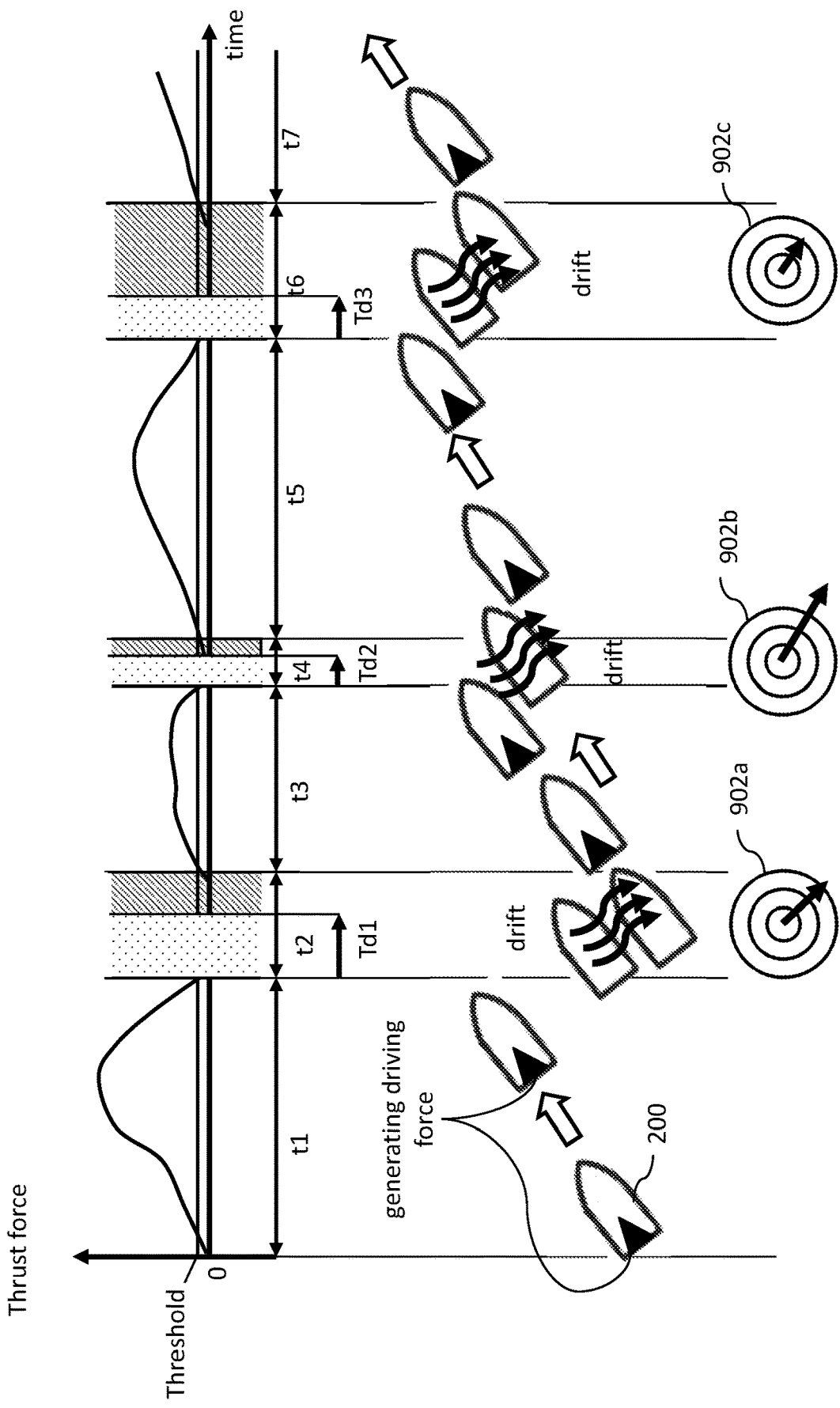
FIG. 9 illustrates an exemplary scenario for determination of the disturbance data according to yet another embodiment of the present disclosure.

FIG. 9 illustrates an exemplary scenario for determination of the disturbance data according to yet another embodiment of the present disclosure. In this embodiment, the predetermined period of time (dead period) is based on a cruising speed of the ship 200 when the thrust force has fallen below the threshold value. The processing circuitry 5 determines the drift direction and the drift speed of the disturbance acting on the ship 200, when the cruising speed of the ship is less than a threshold cruising speed while the thrust force is less than the threshold value. The predetermined period of time is not same each time when the thrust force falls below the threshold value. The predetermined period of time is determined based on the cruising speed as the ship 200 may be affected by the propulsion force due to the inertial force of the ship 200, but the time for which the inertial force remains depends on the cruising speed of the ship.

A graph showing how the thrust force changes with the passage of time and a movement of the ship 200 in relation to the change is shown in FIG. 9. In the graph, the horizontal axis shows "time" and the vertical axis shows "thrust force" of the ship 200. Here, the rotational speed of the motor (engine) is employed indicating the magnitude of the thrust force. The graph further includes an indication for the threshold value for the thrust force denoted as "Threshold" in the graph. FIG. 9 further includes indicators 902a-902c indicating the determined drift directions and the determined drift speeds of disturbances when the disturbance estimation processing is performed.

As shown in FIG. 9, the thrust force increases and decreases as time passes from the start. The thrust force is greater than the threshold during the time periods t1, t3, t5, and t7, during which the driving force or the thrust force is generated due to the high rotational speed of the motor. The thrust force is less than the threshold value three times, i.e., during the time periods t2, t4, and t6. In one embodiment, the threshold value may be zero. In another embodiment, the threshold value may not be zero. Therefore, even if the rotational speed of the motor is not completely zero, the thrust force is gone. Thus, for the sake of ongoing discussions it is assumed that the threshold value is slightly higher than zero.

Further, during the time periods t2, t4, and t6, the thrust force is less than the threshold value and the dead periods td1, td2, and td3 are determined based on the cruising speed of the ship 200 when the time periods t2, t4, and t6 start, respectively. In one embodiment, the dead period is longer if the cruising speed of the ship 200 is higher at the start of the corresponding time period when the thrust force falls below the threshold value and shorter if the cruising speed of the ship 200 is lower. Once dead periods td1, td2, and td3 the have elapsed, and even if the thrust force is less than the threshold value, the disturbance estimation apparatus 1 determines the disturbance data including the drift directions and the drift speeds for corresponding time period in which the ship 200 is swept or drifted by the disturbance.

In one embodiment, the dead period when the determination of disturbance estimation is to be stopped may be automatically calculated from the hull characteristics of the ship 200. In general, the motion of the hull and the behavior of the rotational speed of the propeller-shaft system are simply expressed by the following equation (1) given below:

$$(1+a)\Delta \frac{du_s}{dt} = T - ku_s^2 \quad (1)$$

where,
Δ: displacement (mass) (kg),
a: added-water mass coefficient,
Us: ship speed (m/s),
t: time (s),
T: effective thrust (N), and
k: total resistance coefficient (kg/m)

Here, if the effective thrust T=0, coasting is represented. If the equation of motion is solved using the initial speed as the starting speed, the ship speed at each time is expressed by equation (2) given below:

$$u_{sf} = 1 / \left( \frac{k}{(1+a)\Delta} t + \frac{1}{u_0} \right) \quad (2)$$

where,
Usf: ship speed at each time (m/s), and
$U_0$: Initial speed

As the initial speed in considered in equation (2), it is possible to estimate the approximate time until the end of coasting by giving the ship speed at the start of the stop determination and calculating "t" when the ship speed becomes less than a certain value (for example, 1 m/s).

Figure 10:
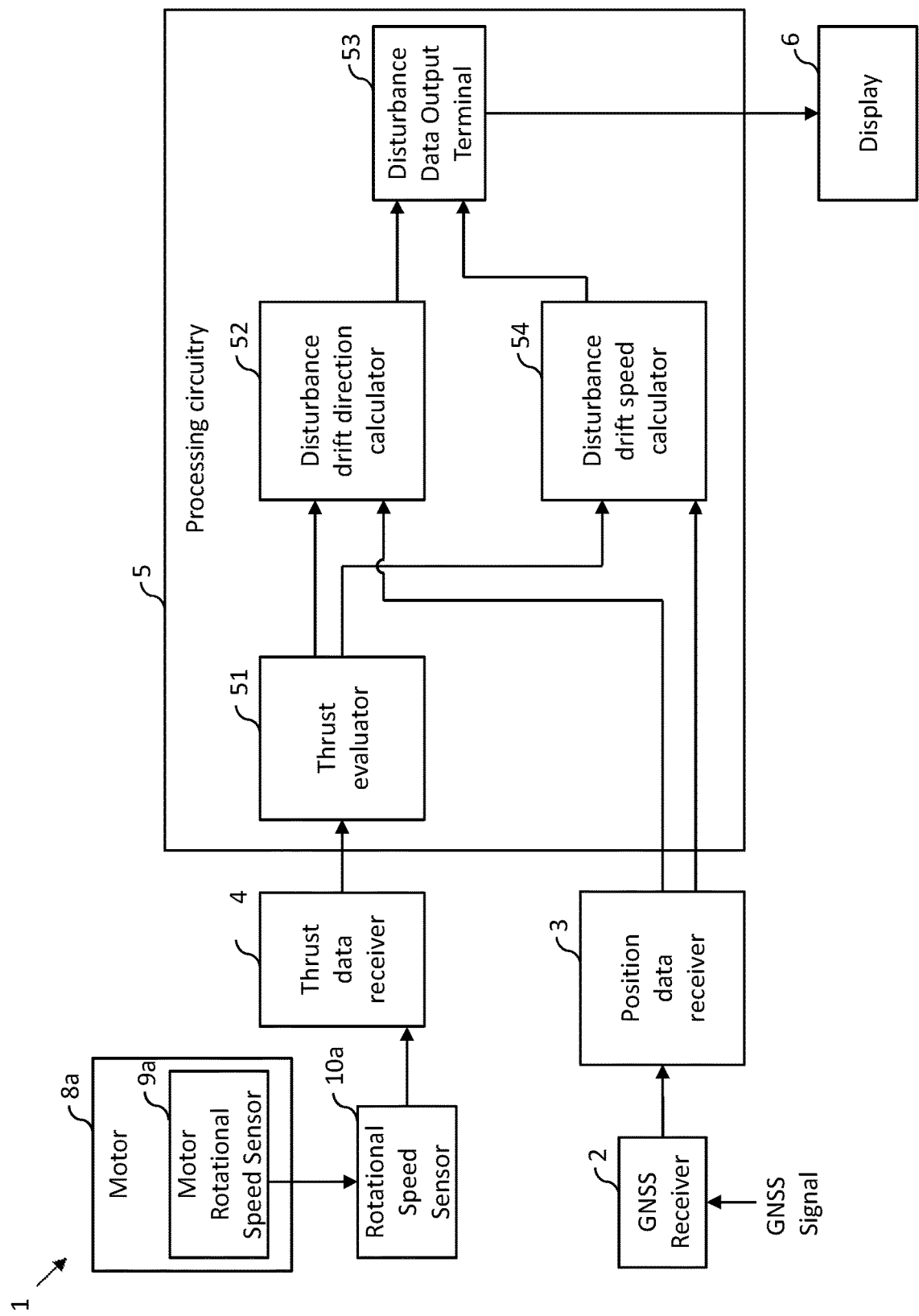
FIGS. 10-12 are block diagrams illustrating a configuration of the disturbance estimation apparatus according to various embodiments of the present disclosure.
Figure 11:
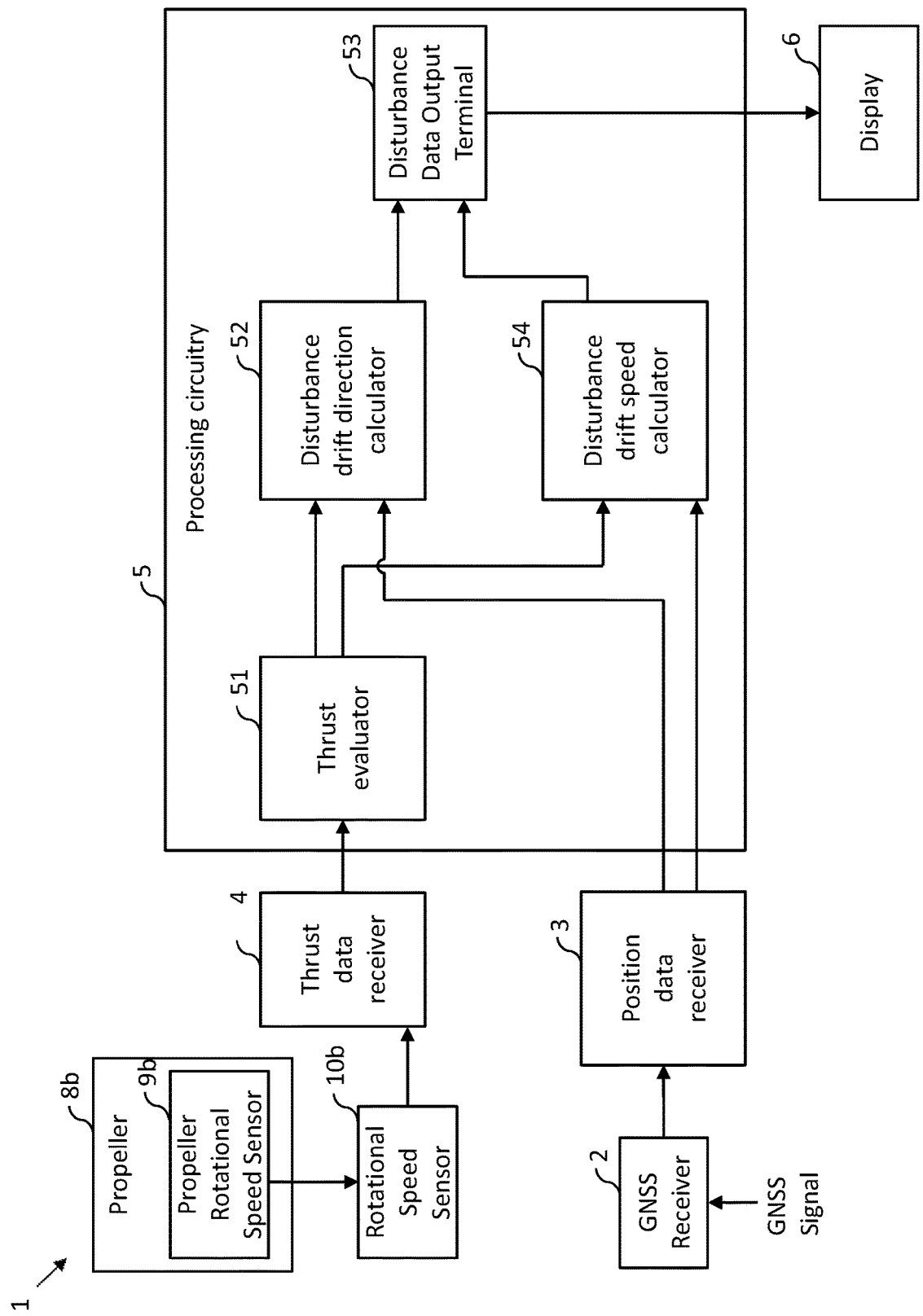
Figure 12:
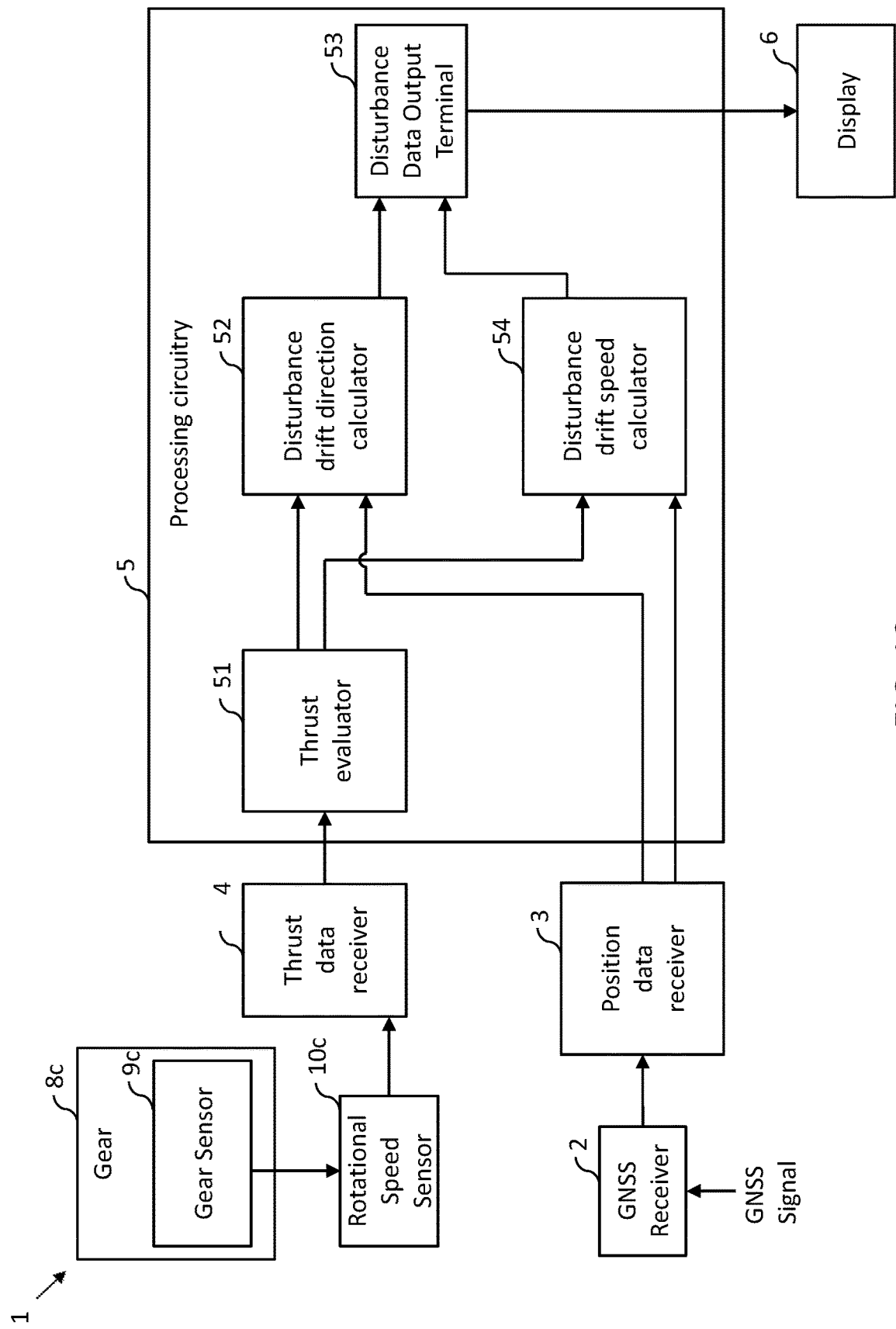

FIGS. 10-12 are block diagrams illustrating a configuration of the disturbance estimation apparatus 1 according to various embodiments of the present disclosure. Referring now to FIG. 10, the disturbance estimating apparatus 1 further includes a motor 8a including a motor rotational speed sensor 9a, and a rotational speed sensor 10a. The motor 8*a* is a driving power source of the ship 200 having a configuration for measuring the generated propulsion force (thrust force) as the motor rotational speed sensor 9*a*. The measured thrust force is provided to the rotational speed sensor 10*a* to generate the thrust data. The thrust data corresponds to a rotational speed of the motor 8*a* that is the driving power source of the ship. The rotational speed is measured by the sensor 9*a* attached to the motor 8*a*. The rotational speed sensor 10*a* provides the thrust data to the thrust data receiver 4. Examples of the communication mode utilized by the sensors and other elements, include but are not limited to, serial communication (NMEA 0183), Ethernet, CAN (NMEA 2000), based on the environment of the ship 200.

Referring now to FIG. 11, the disturbance estimating apparatus 1 further includes a propeller 8*b* including a propeller rotational speed sensor 9*b*, and a rotational speed sensor 10*b*. The propeller 8*b* drives the ship 200 having a configuration for measuring the generated propulsion force (thrust force) as the propeller rotational speed sensor 9*b*. The measured thrust force is provided to the rotational speed sensor 10*b* to generate the thrust data. The thrust data corresponds to a rotational speed of the propeller 8*b* that drives the ship. The rotational speed is measured by the sensor 9*b* attached to the propeller 8*b*. The rotational speed sensor 10*b* provides the thrust data to the thrust data receiver 4. The trust data including the number of revolutions is outputted to the thrust data receiver 4.

Referring now to FIG. 12, the disturbance estimating apparatus 1 further includes a gear 8*c* including a gear sensor 9*c*, and a rotational speed sensor 10*c*. The gear 8*c* is a transmission that is arranged between the motor and the propeller having a configuration for detecting whether the transmission connects or disconnects the motor and the propeller. The thrust data includes transmission connection data indicating whether the transmission connects or disconnects the motor and the propeller. A state of the gears 8*c* arranged between the motor (engine) and the propeller of the ship 200 is evaluated by the sensor 9*c* attached to the shift lever. In this case, the magnitude of the thrust force is not indicated by the number of revolutions, but by the state of the connection: forward, neutral, or backward. The thrust force is considered to be zero when the shift lever is set to neutral. The processing circuitry 5 is further configured to detect whether the transmission connects or disconnects the motor and the propeller based on the transmission connection data, and determine the disturbance data while the transmission connects the motor to the propeller.

Figure 13A:
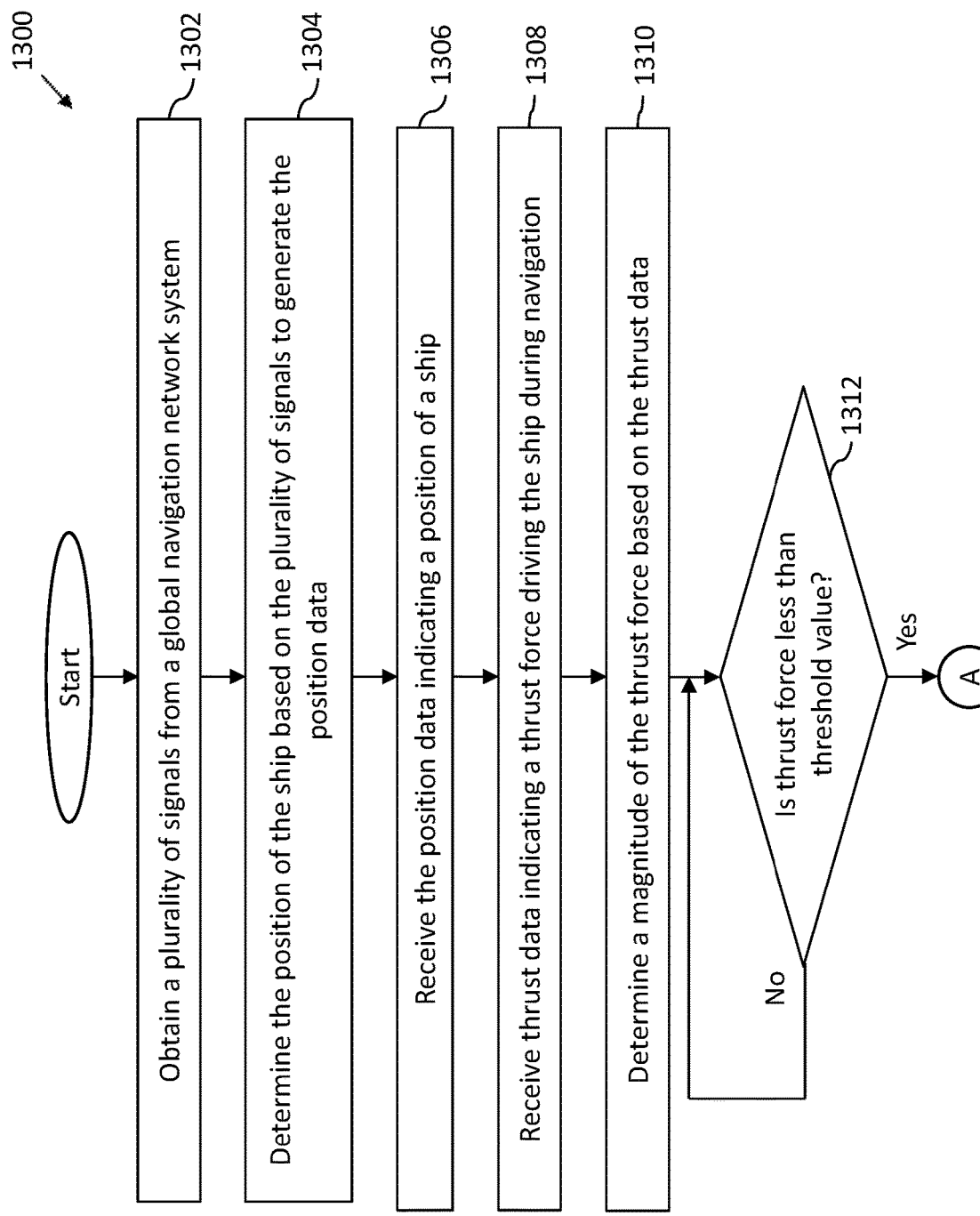
FIGS. 13A and 13B, collectively, represent a flow chart illustrating a disturbance estimation method in accordance with an embodiment of the present disclosure.
Figure 13B:
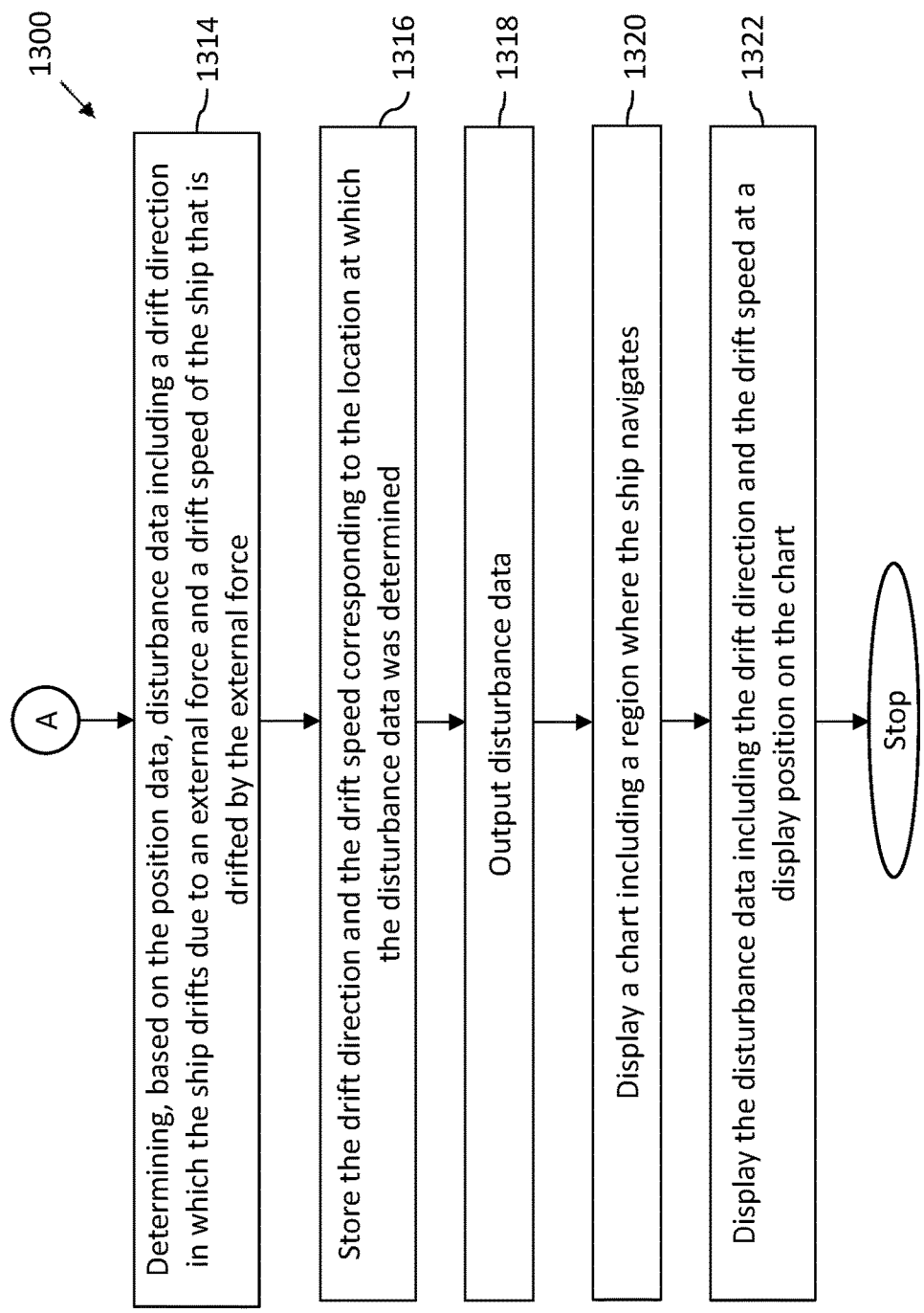

FIGS. 13A and 13B, collectively, represent a flow chart illustrating a disturbance estimation method 1300 in accordance with an embodiment of the present disclosure.

At step 1302, the GNSS receiver 2 obtains the plurality of signals (GNSS signal) from the global navigation network system. At step 1304, the GNSS receiver 2 determines the position of the ship 200 based on the plurality of signals to generate the position data. At step 1306, the processing circuitry 5 receives the position data indicating the position of the ship 200.

At step 1308, the processing circuitry 5 receives the thrust data indicating a thrust force driving the ship 200 during navigation. At step 1310, the processing circuitry 5 determines a magnitude of the thrust force based on the thrust data.

At step 1312, the processing circuitry 5 determines whether the thrust force is less than the threshold value. If at step 1312, the processing circuitry 5 determines that the thrust force is not less than the threshold value, step 1312 is executed again. If at step 1312, the processing circuitry 5 determines that the thrust force is less than the threshold value, step 1314 is executed.

At step 1314, the processing circuitry 5 determines, based on the position data, the disturbance data including the drift direction in which the ship 200 drifts due to an external force and the drift speed of the ship 200 that is drifted by the external force. At step 1316, the processing circuitry 5 stores the drift direction and the drift speed corresponding to the location at which the disturbance data was determined. At step 1318, the processing circuitry 5 outputs the disturbance data that indicates disturbance acting on the ship 200 and assists to control movement of the ship 200.

At step 1320, the display 6 displays a chart including a region where the ship 200 navigates. At 1322, the display 6 displays the disturbance data including the drift direction and the drift speed at a display position on the chart.

Figure 14:
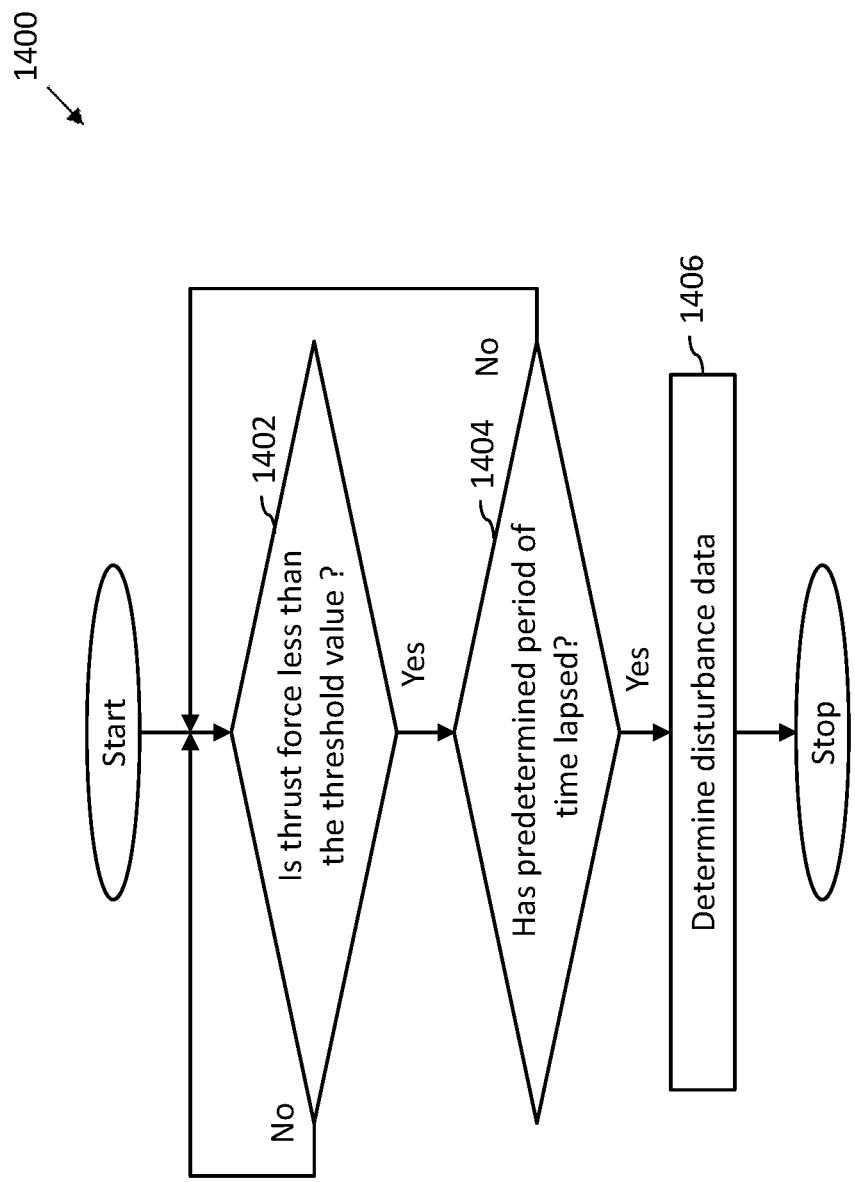
FIG. 14 represents a flow chart illustrating a condition for estimation of disturbance data in accordance with an embodiment of the present disclosure.

FIG. 14 represents a flow chart 1400 illustrating a condition for estimation of disturbance data in accordance with an embodiment of the present disclosure.

At step 1402, the processing circuitry 5 determines whether the thrust force is less than the threshold value. If at step 1402, the processing circuitry 5 determines that the thrust force is not less than the threshold value, step 1402 is executed again. If at step 1402, the processing circuitry 5 determines whether the thrust force is less than the threshold value, step 1404 is executed.

At step 1404, the processing circuitry 5 determines whether the predetermined period of time (dead period) has lapsed. If at step 1404, the processing circuitry 5 determines that the predetermined period of time (dead period) has not lapsed, step 1402 is executed again. If at step 1404, the processing circuitry 5 determines that the predetermined period of time (dead period) has lapsed, step 1406 is executed. At step 1406, the processing circuitry 5 determines the disturbance data.

Figure 15:
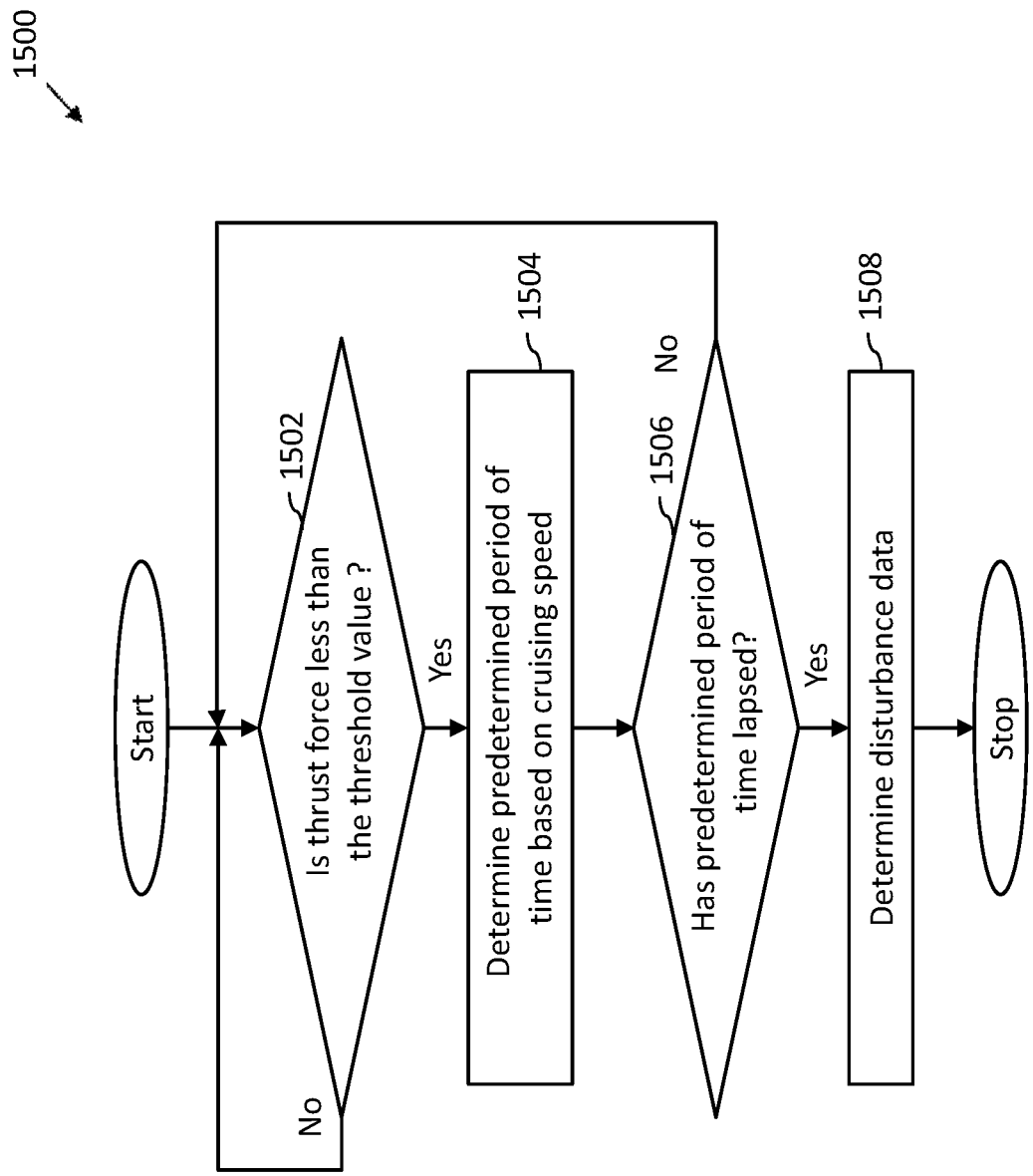
FIG. 15 represents a flow chart illustrating a condition for estimation of disturbance data in accordance with another embodiment of the present disclosure.

FIG. 15 represents a flow chart 1500 illustrating a condition for estimation of disturbance data in accordance with another embodiment of the present disclosure.

At step 1502, the processing circuitry 5 determines whether the thrust force is less than the threshold value. If at step 1502, the processing circuitry 5 determines that the thrust force is not less than the threshold value, step 1502 is executed again. If at step 1502, the processing circuitry 5 determines whether the thrust force is less than the threshold value, step 1504 is executed. At step 1504, the processing circuitry determines the predetermined period of time (dead period) based on a cruising speed of the ship 200.

At step 1506, the processing circuitry 5 determines whether the predetermined period of time (dead period) has lapsed. If at step 1506, the processing circuitry 5 determines that the predetermined period of time (dead period) has not lapsed, step 1502 is executed again. If at step 1506, the processing circuitry 5 determines that the predetermined period of time (dead period) has lapsed, step 1508 is executed. At step 1508, the processing circuitry 5 determines the disturbance data.

Figure 16:
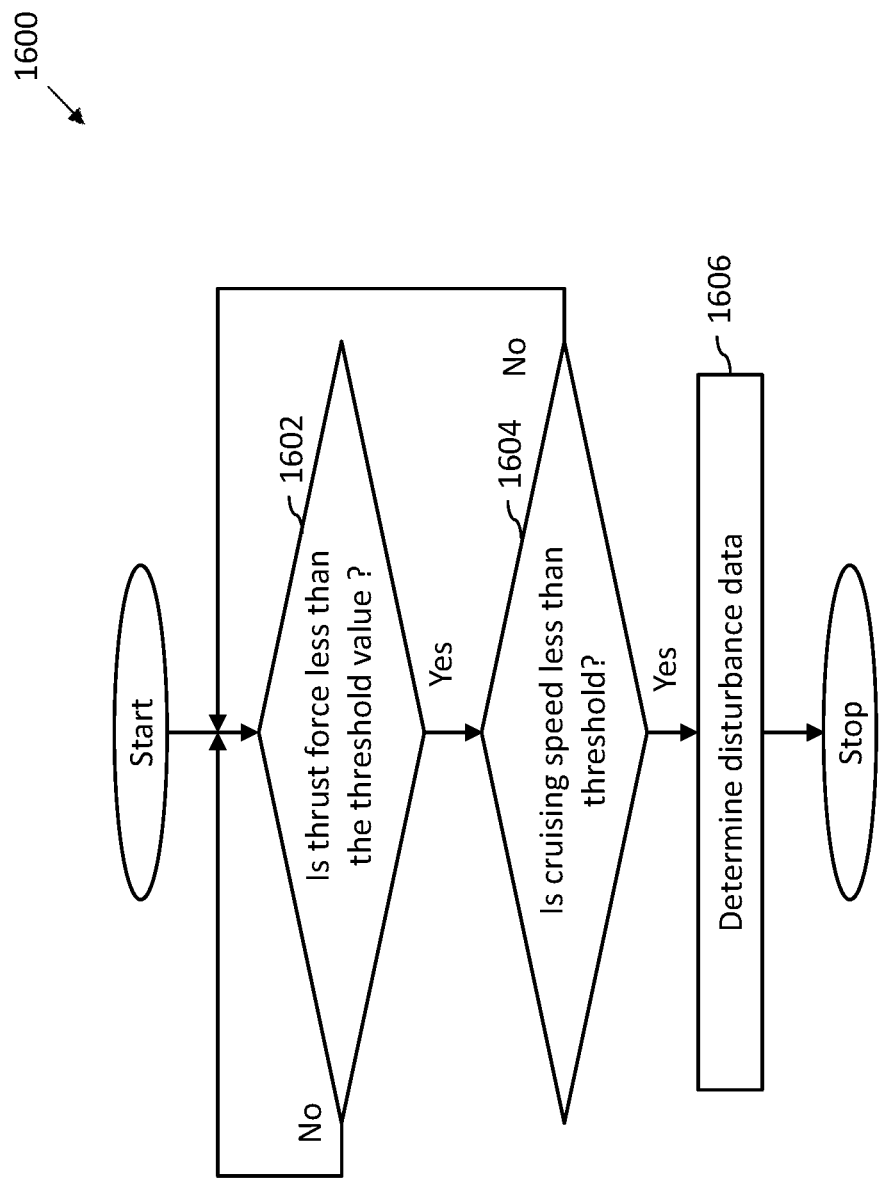
FIG. 16 represents a flow chart illustrating a condition for estimation of disturbance data in accordance with an embodiment of the present disclosure.

FIG. 16 represents a flow chart 1600 illustrating a condition for estimation of disturbance data in accordance with an embodiment of the present disclosure.

At step 1602, the processing circuitry 5 determines whether the thrust force is less than the threshold value. If at step 1602, the processing circuitry 5 determines that the thrust force is not less than the threshold value, step 1602 is executed again. If at step 1602, the processing circuitry 5 determines whether the thrust force is less than the threshold value, step 1604 is executed.

At step 1604, the processing circuitry 5 determines whether the cruising speed is less than the threshold cruising speed. If at step 1604, the processing circuitry 5 determines that the cruising speed is not less than the threshold cruising speed, step 1602 is executed again. If at step 1602, the processing circuitry 5 determines that the cruising speed is less than the threshold cruising speed, step 1606 is executed. At step 1606, the processing circuitry 5 determines the disturbance data.

The disturbance estimation apparatus 1 of the present disclosure enables the ship 200 to accurately grasp the disturbances, as a result the ship will be able to be controlled ahead of time when the ship 200 changes direction. As well as improving the performance of holding the ship 200 at a fixed position is enabled by accurately grasping disturbances, leading to improvement of straight running and turning performance. For example, when turning, the trim rudder angle for resisting the disturbances is reset. As the disturbance is grasped ahead of turning, the required trim rudder angle can relatively easily be predicted. The disturbance data is displayed on a display to indicate the disturbances accurately. In addition to the advantages of manual operation, especially for those who are fishing, how fast the current ship 200 is drifting in which direction is valuable for obtaining a movement of fish. The disturbance data is one of important information that assists the user in navigation of ship 200 or holding the ship 200 at fixed position or while fishing.

It is to be understood that not necessarily all objectives or advantages may be achieved in accordance with any particular embodiment described herein. Thus, for example, those skilled in the art will appreciate that certain embodiments may be configured to operate in a manner that achieves or optimizes one advantage or group of advantages as taught herein without necessarily achieving other objects or advantages as may be taught or suggested herein.

All processes described herein may be embodied in, and fully automated via, software code modules executed by a computing system that includes one or more computers or processors. The software code modules may be stored in any type of non-transitory computer-readable medium or other computer storage device. Some or all methods may be embodied in specialized computer hardware.

Many other variations other than those described herein will be apparent from this disclosure. For example, depending on the embodiment, certain actions, events, or functions of any of the algorithms described herein may be performed in different sequences, and may be added, merged, or excluded altogether (e.g., not all described actions or events are required to execute the algorithm). Moreover, in certain embodiments, operations or events are performed in parallel, for example, through multithreading, interrupt handling, or through multiple processors or processor cores, or on other parallel architectures, rather than sequentially. In addition, different tasks or processes can be performed by different machines and/or computing systems that can work together.

The various exemplary logical blocks and modules described in connection with the embodiments disclosed herein can be implemented or executed by a machine such as a processor. The processor may be a microprocessor, but alternatively, the processor may be a controller, a microcontroller, or a state machine, or a combination thereof. The processor can include an electrical circuit configured to process computer executable instructions. In another embodiment, the processor includes an application specific integrated circuit (ASIC), a field programmable gate array (FPGA), or other programmable device that performs logical operations without processing computer executable instructions. The processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, the processor may also include primarily analog components. For example, some or all of the signal processing algorithms described herein may be implemented by analog circuitry or mixed analog and digital circuitry. A computing environment may include any type of computer system, including, but not limited to, a computer system that is based on a microprocessor, mainframe computer, a digital signal processor, a portable computing device, a device controller, or a computing engine within the device.

Unless otherwise stated, conditional languages such as "can," "could," "will," "might," or "may" are understood within the context as used in general to convey that certain embodiments include, while other embodiments do not include, certain features, elements and/or steps. Thus, such conditional languages are not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive languages, such as the phrase "at least one of X, Y, or Z," unless specifically stated otherwise, is understood with the context as used in general to present that an item, term, etc., may be either X, Y, or Z, or any combination thereof (e.g., X, Y, and/or Z). Thus, such a disjunctive language is not generally intended to, and should not, imply that certain embodiments require at least one of X, at least one of Y, or at least one of Z to each be present.

Any process descriptions, elements, or blocks in the flow diagrams described herein and/or shown in the accompanying drawings should be understood as potentially representing modules, segments, or parts of code, including one or more executable instructions for implementing a particular logical function or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under" are defined with respect to the horizontal plane.

As used herein, the terms "attached," "connected," "coupled," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. A disturbance estimation apparatus, comprising:
a position data receiver configured to receive position data indicating a position of a ship;
a thrust data receiver configured to receive thrust data indicating a thrust force driving the ship during navigation; and
processing circuitry configured to:
determine a magnitude of the thrust force based on the thrust data;
determine, based on the position data, disturbance data including a drift direction in which the ship drifts due to an external force while the thrust force is less than a threshold value; and
output the disturbance data, wherein the disturbance data indicates disturbance acting on the ship and assists to control movement of the ship, wherein
determination of the disturbance data is performed when the thrust force is less than the threshold value and an operation of generating the thrust force is stopped, the determination of the disturbance data being initiated only after a predetermined period has elapsed since the thrust force fell below the threshold value,
the determination of the disturbance data is interrupted when the thrust force is greater than the threshold value and the thrust force is generated,
the predetermined period is adjusted based on a cruising speed of the ship, and
the predetermined period becomes longer when the cruising speed of the ship is higher at a start of the predetermined period, and shorter when the cruising speed is lower.

2. The disturbance estimation apparatus of claim 1, further comprising:
a display configured to display:
a chart including a region where the ship navigates; and
the disturbance data including the drift direction at a display position on the chart,
wherein the display position corresponds to a location at which the disturbance data is determined.

3. The disturbance estimation apparatus of claim 1, wherein the processing circuitry is further configured to:
determine, based on the position data, a drift speed of the ship that is drifted by the external force while the thrust force is less than the threshold value, wherein the disturbance data further includes the drift speed of the ship.

4. The disturbance estimation apparatus of claim 3, further comprising:
a display configured to display:
a chart including a region where the ship navigates; and
the disturbance data including the drift direction and the drift speed at a display position on the chart, wherein the display position corresponds to a location at which the disturbance data is determined.

5. The disturbance estimation apparatus of claim 1, further comprising:
a global navigation satellite system (GNSS) receiver configured to:
obtain a plurality of signals from a global navigation network system;
determine the position of the ship based on the plurality of signals to generate the position data; and
provide the position data to the position data receiver.

6. The disturbance estimation apparatus of claim 1, wherein the thrust data corresponds to a rotational speed of a motor that is a driving power source of the ship, and wherein the rotational speed is measured by a sensor attached to the motor.

7. The disturbance estimation apparatus of claim 6, wherein the thrust data is a rotational speed of a propeller that drives the ship, and wherein the rotational speed is measured by a sensor attached to the propeller.

8. The disturbance estimation apparatus of claim 7, wherein:
the thrust data includes transmission connection data indicating whether a transmission connects or disconnects the motor and the propeller,
the transmission is arranged between the motor and the propeller, and
the processing circuitry is further configured to detect whether the transmission connects or disconnects the motor and the propeller based on the transmission connection data, and determine the disturbance data while the transmission connects the motor to the propeller.

9. The disturbance estimation apparatus of claim 1, wherein
the predetermined period is calculated based on the hull characteristics of the ship.

10. The disturbance estimation apparatus of claim 9, wherein the hull characteristics include at least one of displacement, added-water mass coefficient, and total resistance coefficient.

11. A disturbance estimation method, comprising:
receiving position data indicating a position of a ship;
receiving thrust data indicating a thrust force driving the ship during navigation;
determining a magnitude of the thrust force based on the thrust data;
determining, based on the position data, disturbance data including a drift direction in which the ship drifts due to an external force while the thrust force is less than a threshold value; and
outputting the disturbance data, wherein the disturbance data indicates disturbance acting on the ship and assists to control movement of the ship, wherein
determination of the disturbance data is performed when the thrust force is less than the threshold value and an operation of generating the thrust force is stopped, the determination of the disturbance data being initiated only after a predetermined period has elapsed since the thrust force fell below the threshold value,
the determination of the disturbance data is interrupted when the thrust force is greater than the threshold value and the thrust force is generated,
the predetermined period is adjusted based on a cruising speed of the ship, and
the predetermined period becomes longer when the cruising speed of the ship is higher at a start of the predetermined period, and shorter when the cruising speed is lower.

12. The disturbance estimation method of claim 11, further comprising:
displaying a chart including a region where the ship navigates; and
displaying the disturbance data including the drift direction at a display position on the chart, wherein the display position corresponds to a location at which the disturbance data is determined.

13. The disturbance estimation method of claim 11, further comprising:
determining, based on the position data, a drift speed of the ship that is drifted by the external force while the thrust force is less than the threshold value, wherein the disturbance data further includes the drift speed of the ship.

14. The disturbance estimation method of claim 13, further comprising:
displaying a chart including a region where the ship navigates; and
displaying the disturbance data including the drift direction and the drift speed at a display position on the chart, wherein the display position corresponds to a location at which the disturbance data is determined.

15. The disturbance estimation method of claim 11, further comprising:
obtaining a plurality of signals from a global navigation network system; and
determining the position of the ship based on the plurality of signals to generate the position data.

16. The disturbance estimation method of claim 11, wherein the thrust data corresponds to a rotational speed of at least one of: a motor that is a driving power source of the ship and a propeller that drives the ship, and wherein the rotational speed is measured by a sensor attached to at least one of: the motor and the propeller.

17. The disturbance estimation method of claim 11, wherein
the predetermined period is calculated based on the hull characteristics of the ship.

18. The disturbance estimation method of claim 17, wherein
the hull characteristics include at least one of displacement, added-water mass coefficient, and total resistance coefficient.

19. A non-transitory computer readable medium having stored thereon computer-executable instructions which, when executed by a computer, cause the computer to:
receive position data indicating a position of a ship;
receive thrust data indicating a thrust force driving the ship during navigation;
determine a magnitude of the thrust force based on the thrust data;
determine, based on the position data, disturbance data including a drift direction in which the ship drifts due to an external force while the thrust force is less than a threshold value; and
output the disturbance data, wherein the disturbance data indicates disturbance acting on the ship and assists to control movement of the ship, wherein
determination of the disturbance data is performed when the thrust force is less than the threshold value and an operation of generating the thrust force is stopped, the determination of the disturbance data being initiated only after a predetermined period has elapsed since the thrust force fell below the threshold value,
the determination of the disturbance data is interrupted when the thrust force is greater than the threshold value and the thrust force is generated,
the predetermined period is adjusted based on a cruising speed of the ship, and
the predetermined period becomes longer when the cruising speed of the ship is higher at a start of the predetermined period, and shorter when the cruising speed is lower.

* * * * *